(12) United States Patent
Braunstein et al.

(10) Patent No.: US 6,310,342 B1
(45) Date of Patent: Oct. 30, 2001

(54) OPTICAL MICROSCOPE STAGE FOR SCANNING PROBE MICROSCOPE

(75) Inventors: David Braunstein, Campbell; Michael Kirk; Quoc Ly, both of San Jose; Thai Nguyen, Sunnyvale, all of CA (US)

(73) Assignee: ThermoMicroscopes Corporation, Sunnyvale, CA (US)

( * ) Notice: Subject to any disclaimer, the term of this patent is extended or adjusted under 35 U.S.C. 154(b) by 0 days.

(21) Appl. No.: 09/128,885

(22) Filed: Aug. 4, 1998

Related U.S. Application Data

(63) Continuation of application No. 08/808,351, filed on Feb. 28, 1997, now Pat. No. 5,854,487.

(51) Int. Cl.[7] ............................ H01J 37/20; G02B 21/18; G01N 21/01
(52) U.S. Cl. ................... 250/306; 250/442.11; 250/307; 359/372; 359/393
(58) Field of Search ........................... 250/306, 442.11, 250/307; 359/393, 372, 373; 73/863

(56) References Cited

U.S. PATENT DOCUMENTS

| | | | |
|---|---|---|---|
| 5,337,178 | * 8/1994 | Kung | 359/393 |
| 5,376,790 | * 12/1994 | Linker | 250/306 |
| 5,448,399 | * 9/1995 | Park | 359/372 |
| 5,504,366 | * 4/1996 | Weiss | 73/863 |
| 5,675,154 | * 10/1997 | Lindsay | 250/442.11 |
| 5,760,396 | * 6/1998 | Lindsay | 250/306 |

* cited by examiner

Primary Examiner—Bruce Anderson
Assistant Examiner—Anthony Quash
(74) Attorney, Agent, or Firm—David J. Weitz; Wilson Sonsini Goodrich & Rosati

(57) ABSTRACT

Scanning probe microscopes and scanning probe heads are provided having improved optical visualization and sample manipulation capabilities. The SPMs and SPM heads include at least one flexure stage for scanning in the x, y and/or z directions. In a preferred embodiment, the SPMs or SPM heads include flexure stages for scanning in the x, y and z directions. The z scanning stage is preferably positioned outside the lateral footprint of the x-y flexure stage so that a probe extending from the z scanning stage is outside the lateral footprint of the instrument. The SPMs and SPM heads are configured to provide top down and bottom up optical views of the sample and/or the probe and enable simultaneous scanning probe microscopy and optical imaging of a sample to be performed. The SPMs and SPM heads are designed to be readily combinable with existing upright and inverted optical microscopes currently available from various major manufacturers.

9 Claims, 23 Drawing Sheets

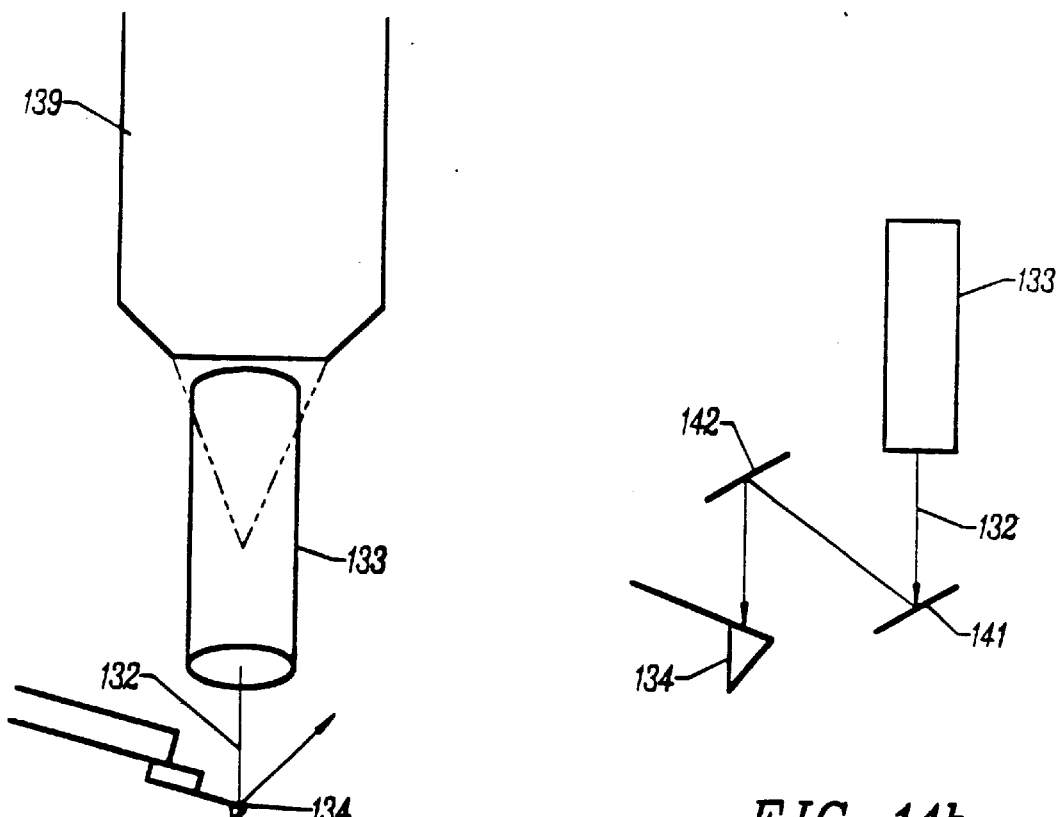
FIG. 14a
FIG. 14b
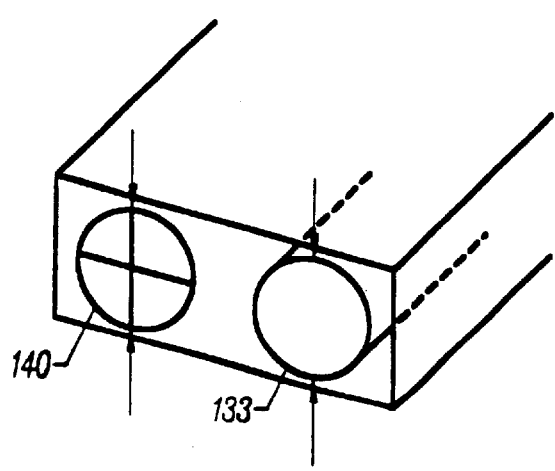
FIG. 15

OPTICAL MICROSCOPE STAGE FOR SCANNING PROBE MICROSCOPE

This application is a continuation of Ser. No. 08/808,351 filed Feb. 28, 1997 now U.S. Pat. No. 5,854,487.

FIELD OF THE INVENTION

The present invention relates to a scanning probe microscope (SPM) which employs one or more flexure stages and providing enhanced optical views of the probe and sample.

BACKGROUND OF THE INVENTION

Scanning probe microscopes (SPMs) are designed to sense one or more physical properties of a surface at a high degree of resolution in order to provide a detailed analysis of the topographical or other properties of a surface. Using scanning probe microscopy, it is possible to detect physical features on the scale of individual atoms and molecules. Among the physical properties which SPMs can image are attractive and repulsive forces due to interatomic forces, electrical potentials, magnetic forces, capacitive forces, and conductive, optical and thermal properties. In addition to detecting physical properties of a surface, SPMs can be used in a variety of applications including the imaging and processing of semiconductors, magnetic materials and storage media, biological materials, polymers, coatings, metals and the like. SPMs are also used in surface science, materials science, crystal growth, electrochemistry and other studies of surfaces. SPM imaging may be perform in ambient, liquid and vacuum environments.

In general, SPMs include a probe which is positioned in very close proximity to a sample surface in order to detect one or more of the above topographic or physical properties of the surface. For example, in scanning force microscopes (SFM), also commonly referred to as atomic force microscopes (AFM), the probe includes a tip which projects from the end of a cantilever and is used to detect interatomic forces between the probe tip and the sample. Typically, the tip is very sharp in order to achieve maximum lateral resolution by confining the force interaction to the end of the tip. A detection system is used to detect the deflection of the cantilever in order to determine the contours of the surface property being probed. In scanning tunneling microscopes (STM), the probe includes a sharp conductive needle-like tip which is used to measure tunneling current flowing between the tip and a conducting or semiconducting sample surface. In STMs, the tip is typically positioned only a few Angstroms above the surface being probed.

The scanning operation of an SPM is performed by a fine x,y,z stage, or scanner. The scanner typically moves the sample or probe in the x-y plane such that the probe follows a raster-type path over the surface to be analyzed. In many SPMs, the scanning movement is generated with a piezoelectric tube. The base of the tube is fixed, while the other end, which may be connected to either the probe or the sample, is free to move both laterally and as vertically input voltage signals are applied to the piezoelectric tube. The use of a piezoelectric tube in this application is well known and is described, for example, in an article by Binnig and Smith, *Rev. Sci. Instrum.*, 57 1688 (1986). An SPM may be operated under feedback control, whereby a feedback controller maintains a constant separation between the probe and sample during a scan by adjusting the z position of the z scanning stage.

A key issue common to all SPMs is the accurate positioning and movement of the probe relative to the sample surface in the x, y and z directions. Movement of the probe and sample relative to each other may be performed by moving the probe, the sample or both the probe and sample. A need exists for SPMs which provide highly accurate scanning in the x, y and z direction. One significant problem in this regard is cross coupling between different scan directions. A need therefore exists for a scanning mechanism which enables the probe and sample to be scanned relative to each other with minimal cross coupling.

The ability to optically view a probe and/or sample before during or after scanning probe microscopy is an important feature of an SPM. Optical viewing facilitates a variety of functions associated with scanning probe microscopy including, for example, coarse adjustment of separation between the probe and the sample, coarse adjustment of the sample position laterally relative to the probe, manipulation of the sample without having to remove the sample or disassemble the instrument and alignment of the cantilever deflection detection system. A need therefore exists for an SPM which is designed to provide enhanced optical viewing of the sample and/or probe in an SPM including the capability to perform optical imaging using the various optical modes of an optical microscope. These and other objectives are provided by the present invention.

SUMMARY OF THE INVENTION

The present invention relates to scanning probe microscopes (SPM) and scanning probe microscope heads (SPM heads) having improved optical visualization and sample manipulation capabilities. Scanning probe microscopy may be performed using the SPMs and SPM heads of the present invention by any mode of SPM imaging including, but not limited to contact atomic force microscopy (AFM), non-contact AFM, lateral force microscopy (LFM), scanning tunneling microscopy (STM), magnetic force microscopy (MFM), scanning capacitance microscopy (SCM), force modulation microscopy (FMM), electrostatic force microscopy (EFM), phase imaging and other modes of operating a scanning probe microscope.

In one embodiment, the SPM or SPM head includes a x-y flexure stage. The x-y flexure stage may be a single plate biaxial flexure stage and is preferably a stacked x-y flexure stage. The SPM or SPM head also includes a z scanning stage for scanning a probe in the z direction relative to a sample.

In one variation of this embodiment, the z scanning stage is positioned off-center relative the a lateral footprint of the x-y flexure stage and more preferably outside the lateral footprint of the x-y flexure stage.

In another variation of this embodiment, the probe is positioned off-center relative to a lateral footprint of the x-y flexure stage, more preferably outside the lateral footprint of the x-y flexure stage, most preferably outside the lateral footprints of the x-y flexure stage and z scanning stage.

In another variation of this embodiment, the z scanning stage is a z flexure stage. In a preferred embodiment of this variation, the z flexure stage is positioned off-center relative to a lateral footprint of the x-y flexure stage and more preferably outside the lateral footprint of the x-y flexure stage.

In another variation of this embodiment, the SPM or SPM head includes more than one z scanning stage. In a preferred variation, the multiple z scanning stages are z flexure stages.

In another embodiment, the SPM or SPM head includes an x-y scanning stage and one or more z flexure stages. In one variation of this embodiment, the one or more z flexure stages are positioned off-center relative to a lateral footprint of the x-y scanning stage and more preferably outside the lateral footprint of the x-y scanning stage.

In any of the above embodiments, the SPM or SPM head may include an x-y scanning stage, a z scanning stage attached to the x-y scanning stage having z sides extending laterally from the x-y scanning stage and having an end distal to the x-y scanning stage, and a bracket containing an SPM probe coupled to the z scanning stage. In one variation, the bracket is mounted to one of the sides of the z scanning stage. By mounting the probe on a bracket in this manner, the distance between the probe and a distant side of the x-y scanning stage is reduced relative to mounting the probe on the distal end of the z scanning stage. The bracket may also include a detection system for the probe.

In any of the above embodiments, a closed loop scanning system is incorporated into the SPM or SPM head.

In any of the above embodiments, the SPM head may be designed to be a stand-alone sensor head which is supported on three or more legs. In this embodiment, the sample is placed on a surface underneath the SPM head. In another embodiment, the sample stage may be an optical stage of an upright or inverted optical microscope.

One feature of the SPMs and SPM heads of the present invention is that they can be configured to provide unobstructed top down and bottom up optical views of the sample and/or the probe.

Another feature of the SPMs and SPM heads of the present invention is that they can be configured to enable simultaneous scanning probe microscopy and optical imaging of a sample to be performed using a variety of optical modes of an optical microscope.

Another feature of the SPMs and SPM heads of the present invention is that they are designed to be readily combinable with existing upright and inverted optical microscopes currently available from various major manufacturers. In one embodiment, an SPM head of the present invention is coupled to an optical microscope where in the stage of the optical microscope serves as the sample stage for the SPM head.

Another feature of the SPMs and SPM heads of the present invention is that they may be used with a variety of modes of an optical microscope. For example, the SPMs and SPM heads may be used to perform probe scanning coupled with epi illumination and an upright optical microscope; epi illumination and an inverted optical microscope; transmissive illumination and an upright optical microscope; and transmissive illumination and an inverted optical microscope.

Another feature of the SPMs and SPM heads of the present invention is their ability to be configured to provide working distances as short as 10 mm and as short as 20 mm when a liquid cell is incorporated into the SPM.

Another feature of the SPMs and SPM heads of the present invention is their ability to be configured to provide improved physical access to a sample so that different tools can be used to manipulate the sample and/or measure properties of the sample. For example, the SPMs and SPM heads can include modifications, such as indentations to permit access of tools to the sample during microscopy.

Another feature of the present invention is that an objective lens and an illumination source may be positioned relative to a probe and sample of an SPM or SPM head to provide either epi or transmitted (Kohler) illumination with simultaneous probe scanning.

Another feature of the present invention is that the SPMs and SPM heads of the present invention can be configured to provide simultaneous probe-scanned SPM with an unobstructed optical view obtained without the assistance of a reflective surface.

Another feature of the present invention is that simultaneous probe-scanned SPM and epi illumination using a standard commercially available upright optical microscope is enabled.

Another feature of the present invention is that simultaneous probe-scanned SPM and transmitted illumination using standard commercially upright and inverted optical microscope is enabled.

Another feature of the present invention is that simultaneous probe-scanned SPM and all the optical modes provided by standard commercially available upright and inverted optical microscopes is enabled.

The present invention also relates to a dual mirror optical deflection detection system. The detection system includes two steerable mirrors, one mirror to steer the laser beam from the laser to the cantilever, and the second mirror to steer light reflected off the cantilever to the detector. In one variation, the laser of the detection system is oriented horizontally, i.e., approximately parallel with the x-y plane. This orientation minimizes the laser's dimensions along the z axis.

An unique aspect of the dual mirror optical deflection detection system is that the area above the cantilever probe is unobstructed. As a result, the space substantially above the cantilever probe is free for both illumination and for direct optical inspection.

In another embodiment, an SPM or SPM head of the present invention includes a locking jack for raising and lowering the head of the SPM relative to the sample stage. The locking jack includes an arm attaching the SPM head to the stage, a spring which biases two or more legs of the SPM head against a surface on which the SPM head is placed, and a locking mechanism which holds the SPM head in a raised position. In this embodiment, the sample stage preferably includes a kinematic mount which allows the SPM head to be raised and lowered relative to the sample stage without having to adjust the positioning of the probe relative to the sample after lowering the SPM head.

The present invention also relates to a sample stage and sample holder designed for use in biological applications. The sample holder may include one or more slots sized to accommodate a coverslip or slide and/or one or more depressions sized to accept a Petri dish. Spring clips or other securing mechanisms may be used to secure a slide in a slot or a Petri dish in a depression.

The sample stage may also include a ring member which is slidable on the sample stage. The ring member is sized to fit around a sample holder such that the sample holder can be positioned within the ring member and moved in the plane of the sample stage by the ring member. The ring is preferably larger than the sample holder so that the sample holder can be disengaged from the ring member for greater mechanical stability during SPM imaging.

The present invention also relates to a combined liquid cell/cantilever chip holder for use in an SPM or SPM head. The liquid cell includes walks which are preferably sized to fit beneath a condenser lens or objective of an optical microscope. The bottom of the liquid cell includes the viewport through which the cantilever probe and sample maybe viewed.

The liquid cell is designed to provide a clear path for the laser beam of an optical deflection detection system through the viewport to the cantilever probe. The liquid cell may also include indentations made along the length of the walls to allow easy access to a sample using a tool.

The liquid cell cantilever holder is preferably kinematically mounted to the SPM head. As a result, the cantilever holder can be accurately and repeatably positioned on the SPM head, and cantilevers can be replaced with minimal realignment of the cantilever deflection detection system. In addition, the cantilever holder can be removed from the SPM head easily by hand without the assistance of tools. This feature is advantageous for use in a variety of applications including the semiconductor process control equipment and applications.

BRIEF DESCRIPTION OF THE DRAWINGS

FIG. 9A illustrates the effect of bowing in a piezoelectric tube scanner.

FIG. 9B illustrates the push-pull effect in a piezoelectric tube scanner.

FIG. 13A illustrates a top down view of the detection system.

FIG. 13B illustrates a lateral view of the detection system.

FIG. 14A illustrates the effect of mounting the laser vertically directly over the probe.

FIG. 14B illustrates the effect of mounting the laser vertically offset from the probe.

FIG. 15 illustrates that the diameter of the laser and the photodetector are the limiting factors with regard to the height profile of the detection system

FIG. 18A illustrates the SPM head in a lowered position.

FIG. 18B illustrates the SPM head in a raised position.

FIG. 19A illustrates a sample holder which includes slots sized to accommodate a coverslip or slide as well as a depression which accepts a Petri dish.

FIG. 19B illustrates a sample holder which includes multiple slots sized to accommodate a series of coverslips or slides.

FIG. 19C illustrates a sample holder which includes multiple depressions sized to accommodate a Petri dish.

FIG. 20A illustrates the sliding motion of the sample holder (side view).

FIG. 20B illustrates the sample being pushed by the ring over the sample stage.

FIG. 21A illustrates an embodiment of a liquid cell.

FIG. 21B illustrates another embodiment of the liquid cell which includes indentations made along the length of the body to allow easier access to the sample using a long narrow tool.

FIG. 21C illustrates a combined liquid cell/cantilever chip holder which allows decreased lens working distance.

DETAILED DESCRIPTION OF THE PREFERRED EMBODIMENT

Figure 1:
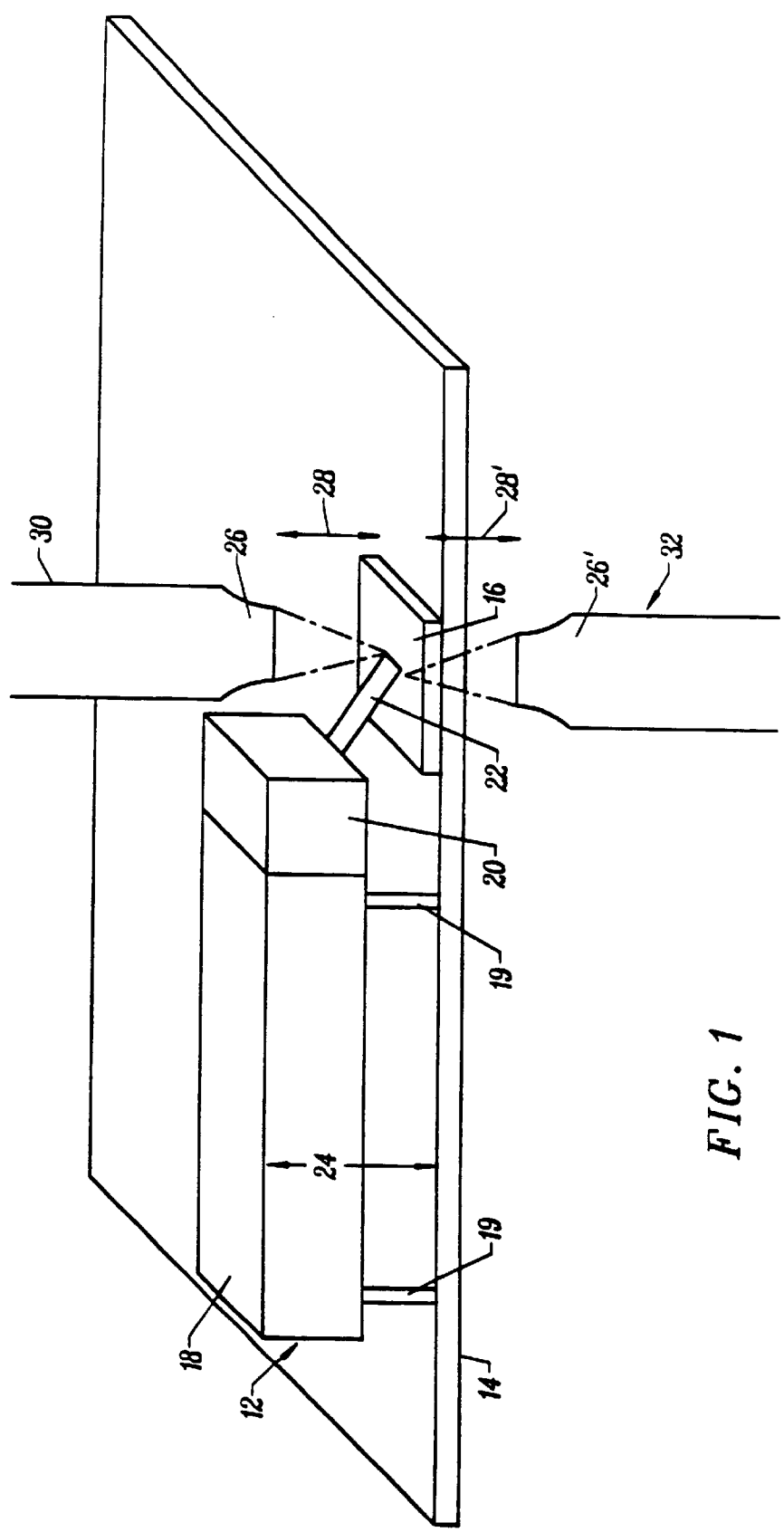
FIG. 1 illustrates an embodiment of an SPM head according to the present invention.

The present invention relates to scanning probe microscopes (SPM) and scanning probe microscope heads (SPM head) having improved optical visualization and sample manipulation capabilities.

The SPMs and SPM heads of the present invention are designed to provide both top down and bottom up unobstructed optical views. In an SPM or SPM head, top down and bottom up optical views are very useful for aligning the probe over the sample and for selecting a region on the sample for scanning.

The SPMs and SPM heads of the present invention are also designed to enable simultaneous scanning probe microscopy and optical imaging of a sample to be performed. For simultaneous SPM and optical imaging, a top down optical view is particularly useful for correlating features in the optical image and the SPM image. U.S. Pat. Nos. 5,376,790 and 5,157,251 provide useful discussions regarding the importance of optical viewing in conjunction with performing scanning probe microscopy and are incorporated herein by reference.

The SPMs and SPM heads of the present invention are also designed to be readily combinable with existing upright and inverted optical microscopes currently available from various major manufacturers. For example, an SPM or SPM head may be coupled to an optical microscope where the stage of the optical microscope serves as the sample stage for the SPM. This embodiment is particularly well suited for use in applications where simultaneous viewing and probing are desired.

The SPMs and SPM heads of the present invention are also designed to be usable with all modes of an optical microscope. For example, the SPMs and SPM heads may be used to perform probe scanning coupled with epi illumination and an upright optical microscope; epi illumination and an inverted optical microscope; transmissive illumination and an upright optical microscope; and transmissive illumination and an inverted optical microscope.

The SPMs and SPM heads of the present invention are designed to achieve nanometer-scale resolution. Resolution down to the atomic scale is also possible according to the present invention.

Some embodiments of the SPMs and SPM heads of the present invention are designed to have a smaller lateral footprint. A smaller lateral footprint provides the instrument with a smaller mechanical loop, i.e., the path between the support structure of the sample and that of the probe on the instrument. By reducing the mechanical loop of the instrument, mechanical stability due to increasing the lowest natural resonance of the instrument is increased, and thermal instability due to thermal expansion and contraction of the instrument are reduced.

The SPMs and SPM heads of the present invention are also designed to improve physical access to a sample so that different tools such as micromanipulators, patch clamp pipettes and pH probes can be used to manipulate the sample and/or measure properties of the sample near the probe of the SPM or simultaneously during imaging. In the case of biological samples, the improved access to the sample also facilitates the manipulation of cell structures while mounted in the SPM. The SPMs and SPM heads can also include modifications, such as indentations to permit access of micromanipulators, patch clamp pipettes, and other tools used for the micromanipulation of cells.

Scanning probe microscopy may be performed using the SPMs and SPM heads of the present invention by any mode of scan probe imaging including, but not limited to contact atomic force microscopy (AFM), non-contact AFM, lateral force microscopy (LFM), scanning tunneling microscopy (STM), magnetic force microscopy (MFM), scanning capacitance microscopy (SCM), force modulation microscopy (FMM), phase imaging, electrostatic force microscopy (EFM), and other modes of operating a scanning probe microscope.

Optical viewing of the probe and sample may be performed by any mode of optical viewing microscopy including, but not limited to confocal microscopy, phase contrast microscopy, differential interference contrast microscopy, Hoffman/modulation contrast microscopy, and other optical modes.

In one particular embodiment, the SPM head is designed to be a stand-alone sensor head which is supported on three or more legs. In this embodiment, the SPM head is set on a sample stage. In one variation of this embodiment, the sample stage is an optical stage of an upright or inverted optical microscope and the sample to be imaged is supported on the optical microscope stage. This embodiment is particularly well suited for use in a variety of biological applications, including, for example, patch clamp cell physiology applications. The optical microscope stages are also well-designed for standard sample holders used in biological imaging, for example, Petri dishes, glass slides, multiwell plates, and the like. However, it should be noted that this stand alone SPM head embodiment can be used with any SPM imaging application.

One aspect of the design of the SPMs and SPM heads which enable top down and bottom up unobstructed optical views of the probe and sample is the low height profile of the SPMs and SPM heads. The low height profile reduces the working distance at which an optical lens and/or an illumination source must be positioned from the sample or probe. As a result, standard objective lenses and condenser lenses can be used with the SPM because the lens can be brought sufficiently close to the probe for the probe to be within the lens's focal length. For example, the SPMs and SPM heads of the present invention provide working distances as short as 10 mm and as short as 20 mm when a liquid cell is incorporated.

Another important aspect of the present invention is the use of an off center geometry for the z scanning stage relative to the x-y scanning stage in the SPMs and SPM heads, i.e., the offset positioning of the z scanning stage relative to the center of translation of the x-y scanning stage. In a preferred embodiment, the z scanning stage is positioned laterally external to the x-y scanning stage. By positioning the z scanning stage off center and preferably external to the x-y scanning stage, improved access to the probe and sample is enabled. In addition, the angular range of the field of view of the probe and sample is improved. Further, the working distance at which a lens for optical viewing and/or an illumination source can be placed relative to the probe and sample is reduced by having the z scanning stage laterally displaced relative to the x-y scanning stage.

Another important aspect of the present invention is the off center geometry of the probe relative to the x-y scanning stage. In a preferred embodiment, the probe is positioned laterally external to the x-y scanning stage, and more preferably external to the x-y and z scanning stages. By positioning the probe off center and preferably external to the x-y and/or x-y and z scanning stages, improved access to the probe and sample is enabled. In addition, the angular range of the field of view of the probe and sample is improved. Further, the working distance at which a lens for optical viewing and/or an illumination source can be placed relative to the probe and sample is reduced by having the probe laterally displaced relative to the x-y or x-y and z scanning stages.

Another important aspect of the present invention is the use of an x-y flexure stage in the SPMs and SPM heads to produce a scanning motion of a probe relative to a stationary sample. One advantage of x-y flexure stages is that it provides highly planar, orthogonal motion by the probe over a surface in the x-y plane. The planarity of the scan produced by x-y flexure stages is particularly improved as compared to tube scanner and tripod scanner designs. X-Y flexure stages also provide minimal coupling with motion in the z axis. As a result, the probe and a stage which provides scanning along the z axis can be laterally displaced relative to the center of motion of the x-y flexure stage which provides the optical viewing and sample handling and manipulation advantages as described above.

Another advantage of x-y flexure stages is the low height profile provided by these stages as compared to tube scanners. As described above, a low height profile facilitates the provision of top down and bottom up unobstructed optical views by the SPMs and SPM heads of the present invention.

The x-y flexure stages used in the SPMs and SPM heads of this invention may be either a stacked x-y flexure stage or a single-plate biaxial x-y flexure stage.

Single-plate biaxial x-y flexure stages have an advantage over stacked x-y flexure stages of having a lower height profile.

Stacked x-y flexure stages have several advantages over single-plate biaxial x-y flexure stages. For example, stacked x-y flexure stages are more easily designed, have a smaller lateral footprint, are less susceptible to thermal drift, provide more orthogonal scanning motion in x and y, exhibit greater decoupling in the x, y, and z scan directions, and are less expensive to manufacture.

Another important aspect of the present invention is the use of one or more z flexure stages to produce a scanning motion of a probe attached to the SPM in the z direction relative to a stationary sample.

In the SPMs and SPM heads of the present invention, the one or more z flexure stages are preferably offset relative to the center of translation [(x,y)=(0,0)] of the x-y scanning stage. This design feature enables the SPMs and SPM heads to be designed to provide improved access to the probe and sample. Improved probe and sample access, in turn, facilitates the use of upright and inverted optical microscopes to provide top down and bottom up optical viewing with, for example, epi or transmissive illumination. The offset positioning of the z flexure stage also facilitates the manipulation of the sample and replacement of the probe.

Laterally offsetting the z stage relative to the center of translation of the x-y scanning stage requires that the scan provided by the x-y scanning stage be substantially perpendicular to the z axis throughout its scanning field. In this regard, it is preferred to use a x-y flexure stage which provides a highly planar scan in combination with an offset z flexure stage. In a particularly preferred embodiment, a stacked x-y flexure stage is used as the x-y scanning stage in order to take advantage of the above described advantages of using a stacked x-y flexure stage.

In one embodiment of the invention, the SPMs and SPM heads are designed for use in biological applications. In particular, the SPMs and SPM heads of this embodiment are designed for the study of live cell cultures, protein assemblies, protein-DNA complexes, and nanodissection of cells, chromosomes, and protein assemblies.

In another embodiment of the invention, the SPMs and SPM heads of the present invention include a low profile dual mirror optical deflection detection system mounted on a z scanning stage. In this detection system, two steerable mirrors are used to steer a laser beam from a laser onto a cantilever and then onto a detector. Key novel features of the optical deflection detection system include a horizontal orientation of the laser in the detection system and the use of dual mirrors in a probe scanning SPM to steer the laser beam from the laser to the cantilever and then to the detector.

The orientation and spacing of the elements used in the detection system enables SPMs and SPM heads which employ this detection system to include a space substantially above the probe that may be used to provide an unobstructed optical view of the probe such that direct optical inspection of the probe with a magnification lens or other optical instrumentation is possible. Accordingly, a magnified optical view of the probe can be achieved without the use of a reflective element.

The present invention also relates to the use of a coarse x-y control stage in combination with a SPM or SPM head which is used to align the cantilever over or under an objective lens of an optical microscope. In one embodiment of the invention, an SPM head is used in combination with an optical microscope wherein the stage of the optical microscope is used as the sample stage for the SPM head. In this embodiment, the SPM head is preferably coupled to the optical microscope stage by a locking jack which allows the SPM head to be raised and lowered relative to the sample stage in order to provide rapid probe and sample access for replacement or manipulation. In this embodiment, the optical microscope stage is also preferably designed to include a kinematic mount that allows the SPM head to be raised and lowered relative to the sample stage without having to adjust the positioning of the probe relative to the sample after raising the SPM head.

The present invention also relates to a ring member which can be slid on the surface of a sample stage and be used to move a sample holder positioned within the ring member on the sample stage by sliding the ring member relative to the surface.

The present invention also relates to a kinematically mounted liquid cell. This liquid cell can be magnetically attached to the SPM, springloaded, or used with some other mechanical attachment. It can allow simultaneous optical and SPM inspection of a sample while in an aqueous solution. It can also incorporate a fluid exchange mechanism. In this preferred embodiment it can be easily replaced when coupled with the above described locking jack mechanism.

The present invention also relates to a kinematically mounted cantilever chip holder which enables easy cantilever chip replacement. The quick-snap self-seating mechanism is useful for a variety of SPM's and inspection systems, including semiconductor process control equipment and applications. The kinematically mounted cantilever chip holder can also be used to facilitate an automatic tip changer which would be motorized, requiring no human physical contact to replace and align the cantilever holder since the holder can be pulled out easily without special tools and can be returned to a predefined position on the instrument without tools or the need for further adjustment.

In any of the embodiments described in this application, standard electronics used to operate existing SPMs and SPM heads may be used.

FIG. 1 illustrates an embodiment of an SPM head 12 according to the present invention which is positioned on a surface 14 containing a sample 16. As illustrated in FIG. 1, the SPM head includes an x-y scanning stage 18, a z scanning stage 20, and a probe 22 offset relative to the x-y scanning stage 18 and z scanning stage 20. As illustrated, the low height profile 24 of the SPM head 12 inclusive of legs 19 enables an objective lens 26, 26' of an optical microscope or an illumination source for a microscope to be positioned within a short working distance 28, 28' above or below the probe 22 and sample 16, thereby enabling the sample to be simultaneously probed and visually observed. As also illustrated, the offset geometry of the probe 22 relative to the SPM head enables the sample to be visually observed from a position 30 above the sample 16 and from a position 32 below the sample 16.

Figure 2:
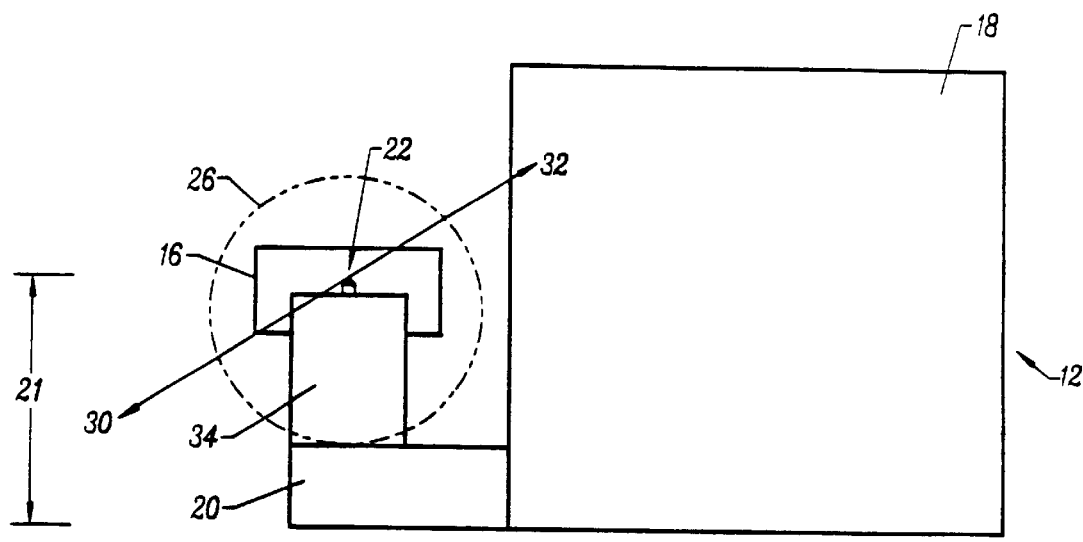
FIG. 2 illustrates a top down view of an embodiment of an SPM head according to the present invention in which the probe is mounted on the z flexure stage by a bracket that extends off the end of the z flexure stage.

FIG. 2 illustrates a top down view of an embodiment of an SPM head 12 where the probe 22 extends from a bracket 34 positioned at a side of the z scanning stage 20. As illustrated, positions above 30 and below 32 the sample 16 are not obstructed by the SPM head and thus can be visually observed by positioning an optic 26 above and/or below the probe and sample 16. As also illustrated, the probe 22 is laterally offset relative to the z scanning stage 20 which reduces the length 21 of the SPM head along a direction extending from the probe 22 to the distant side of the x-y scanning stage 18.

Figure 3:
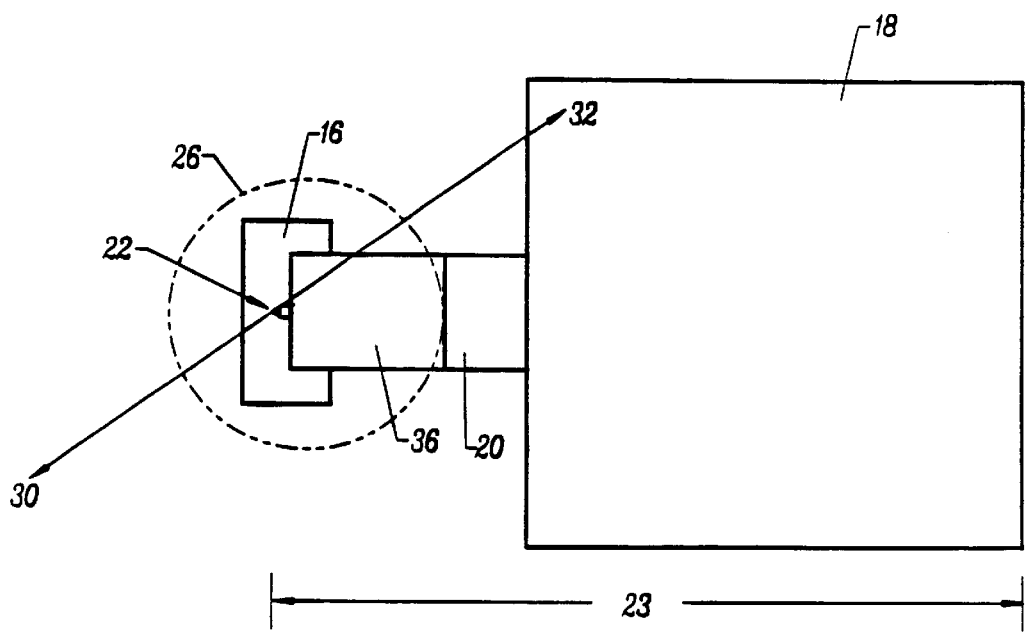
FIG. 3 illustrates a top down view of an alternate embodiment of the SPM head illustrated in FIG. 2 in which the probe is mounted on the z flexure stage by a bracket that extends off a side of the z flexure stage.

FIG. 3 illustrates an alternate embodiment of an SPM head in which the probe 22 is mounted on a bracket 36 which extends off the end of the z scanning stage 20. The distance from the probe to the opposite end of the SPM head is given as length 23 in FIG. 3. This configuration is advantageous in that the probe is mounted on a shorter, more rigid extension from the x-y scanning stage which provides improved mechanical performance.

The orientation of the probe relative to the x-y and z scanning stages is an important design aspect of the present invention. In general, it is desirable to have the probe pointing towards the user in the optical view in order to facilitate the user to steer and align the laser beam onto the back of the cantilever. The distance from the probe to the opposite end of the SPM head is significantly longer in the design illustrated in FIG. 3 (length 23) than in FIG. 2 (length 21). As a result, an SPM head having a design as illustrated in FIG. 3 where the probe extends from an end of the z flexure stage may have difficulty fitting on some optical microscope stages. For instance, the condenser column of inverted optical microscopes is usually situated at the back of the microscope stage. This location restricts the space available to place the SPM head.

The configuration of FIG. 2 where the probe is rotated by 90° relative to the x-y scanning stage is preferred over the configuration illustrated in FIG. 3 because the distance from the probe to the rear edge of the x-y scanning stage is significantly reduced. As a result, the SPM head design can more readily fit under the lenses of most optical microscopes.

Figure 4:
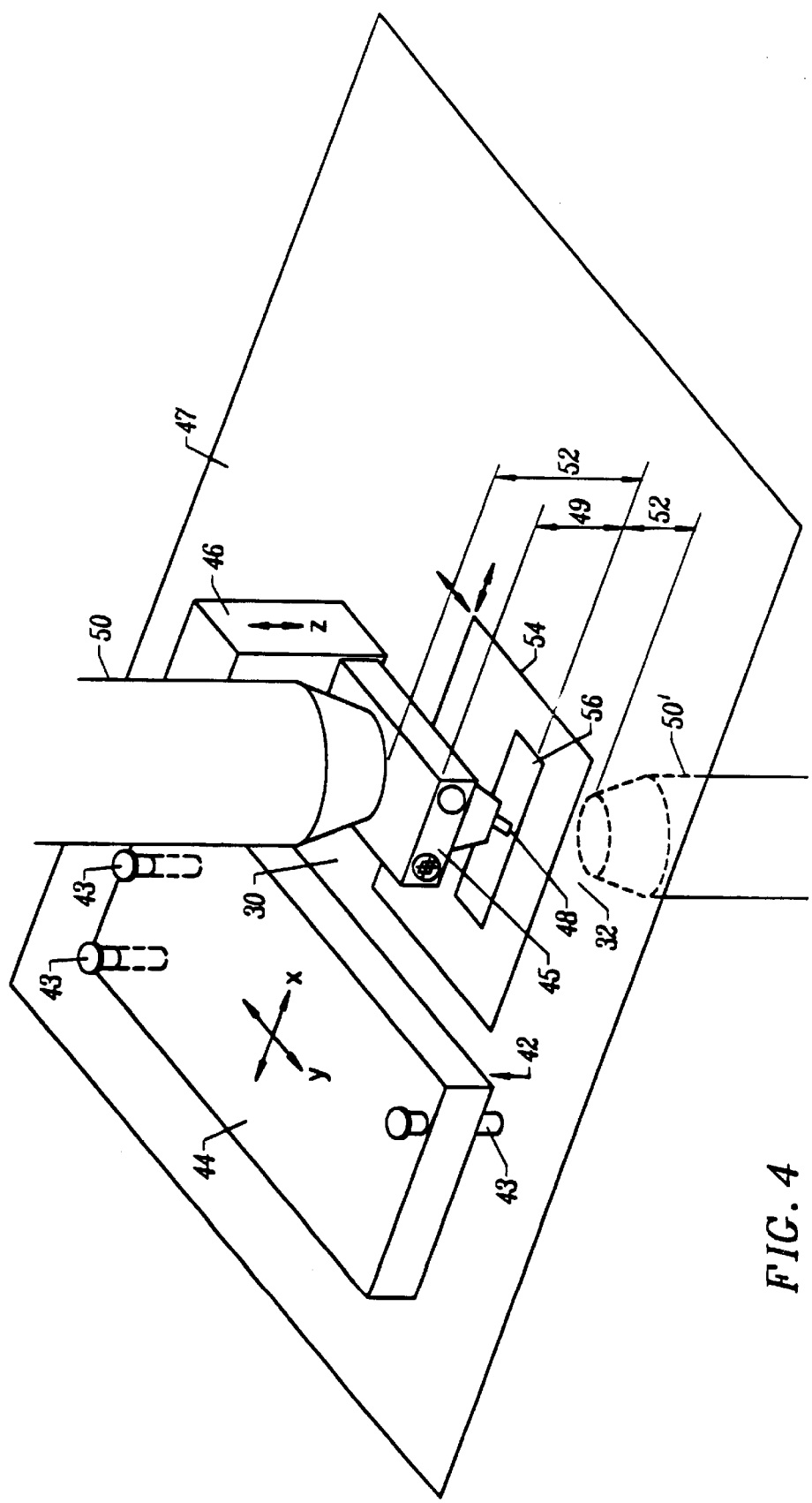
FIG. 4 illustrates an embodiment of an SPM according to the present invention.

FIG. 4 illustrates an embodiment of an SPM 42 according to the present invention. As illustrated, the SPM includes sensor head 42 which includes an x-y scanning stage 44, a z scanning stage 46, and a probe 48 offset relative to the x-y scanning stage 44 and z scanning stage 46. As illustrated, the sensor head 42 has a low height profile 49 which enables an objective lens 50, 50' of an optical microscope to be positioned within a short working distance 52, 52' from the probe 48. The SPM also includes a sample stage 54 on which a sample 56 may be positioned. As also illustrated, the off-set geometry of the probe 48 relative to the sensor head 42 enables the sample to be visually observed from a position 30 above the sample 16 and from a position 32 below the sample 16.

The SPM head also includes a cantilever deflection detector 45. The SPM head 42 is supported on legs 43 and may be set on a surface 47 such as an optical microscope stage.

X-Y Flexure Stage

One important aspect of the present invention is the use of x-y flexure stages in the SPMs and SPM heads which provide the probe with a scanning motion in the x and y directions. By using an x-y flexure stage, SPMs and SPM heads of the present invention have a highly planar, orthogonal scanning motion which is substantially perpendicular to the z axis throughout its scanning field in the x-y plane. In addition, scanning in the z direction is largely decoupled from scanning in the x-y plane.

In general, a flexure stage refers to a planar platform consisting of a plate formed of material capable of being flexed (generally a metal such as aluminum or stainless steel). One or more flexible members are machined into the platform which serve as spring elements. The spring elements connect a stationary portion of the platform to a moving portion of the platform. A piezoactuator is coupled to the platform which serves as a drive mechanism to push the moving portion of the platform relative to the stationary portion of the platform. U.S. Pat. No. 4,506,154 describes the design and manufacturing of examples of flexure stages which may be used in the present invention and is incorporated herein by reference.

In a uniaxial flexure stage, the one or more flexible members allow movement along a single translational degree of freedom and are very rigid in the remaining five degrees of freedom, thereby minimizing movement along the two other translational degrees of freedom and in the three rotational degrees of freedom.

The incorporation of one or more pivoted lever arms into the platform provides a mechanical amplification factor for extension and contraction of the piezoactuator. When one internal spring of the flexure plate is pushed and displaced a certain distance by the piezoactuator, the one or more pivot lever arms push against each other and an amplified displacement can be measured at another location on the plate. The mechanical amplification factor depends on the structure of the machined in spring elements and pivot arms as is well known in the art.

A flexure stage can have a variety of objects mounted on it which are moved by the actuation of the stage. In the present invention, a variety of components of the SPMs or SPM heads can be mounted on the flexure stage, including for example, the probe or sample; components of a cantilever deflection sensor; components of a position sensor for flexure stage motion; and another or multiple flexure stages.

Figure 5:
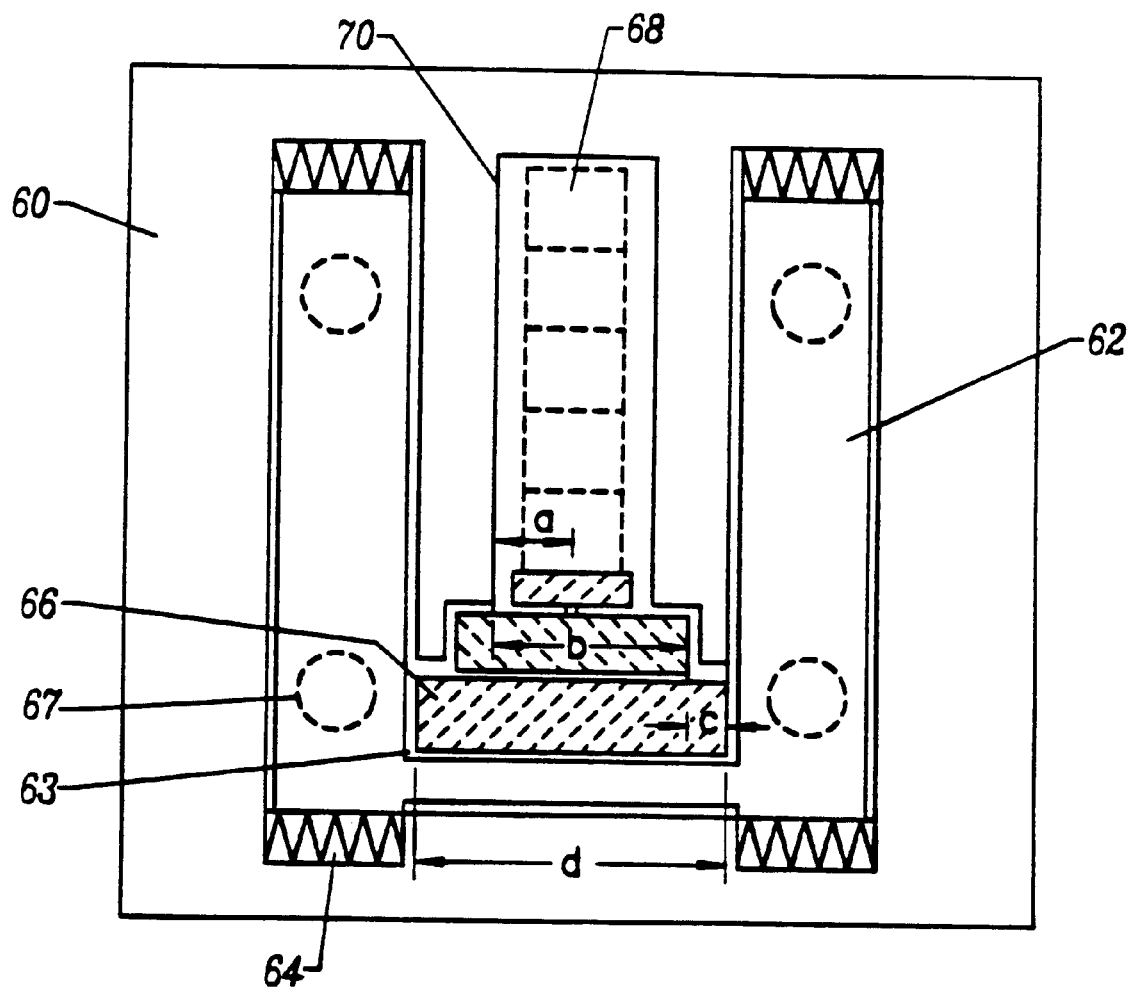
FIG. 5 illustrates an embodiment of a flexure stage which provides motion in a single transnational direction.

FIG. 5 illustrates an embodiment of a flexure stage which provides motion in a single translational direction. It should be noted that a wide variety of designs may be used for a flexure stage which are within the level of ordinary skill and are intended to fall within the scope of the present invention.

As illustrated in FIG. 5, the flexure stage includes an outer frame 60 and an inner portion 62 which can be moved relative to the outer frame 60. Included on the inner frame are mounting points 67 for mounting a second identical flexure stage which is orthogonal to the first stage. The outer frame 60 and inner portion 62 are coupled to each other by machined-in spring elements 64. Also incorporated into the inner portion 62 are multiple pivoted lever arms 66 with pivot points 63. When an actuator 68 is positioned within the slot 70 and coupled to the multiple pivoted lever arms 66, any displacement of the actuator 68 is amplified by the multiple pivoted lever arms 66, thereby causing increased movement of the inner portion 62 relative to the outer frame 60 which is meant to be fixed. The gain factor g for this flexure stage, obtained using the lever amplification principle, is given by $g=b/a \cdot d/c$, where a, b, c, and d are the distances indicated in FIG. 5.

A stacked piezoelectric actuator is often used as the actuator for driving the flexure stage. For a given form factor (shape, relative dimensions), a stacked piezoelectric structure consisting of a series of piezoelectric plates glued or cemented together produces a greater transmittal motion, or extension (throw), than a single plate since piezoelectric displacement varies inversely with thickness of a piezoelectric plate. A stacked piezoelectric actuator also produces a larger actuation force allowing it to push on a relatively stiff mechanism.

In general, stacked piezoactuators alone cannot support a large mass since a large shear force can shear the glued piezoelectric plates apart. However, when the flexure stage is machined out of stainless steel or aluminum, the flexure stage is able to support greater weight than the piezoactuator alone. As a result, the combination of a piezoactuator with a flexure stage provides well-controlled motion and the capability to carry loads up to 50 g or more. Instead of piezoactuators, other types of actuators including motors, voice coils, lead screws, and others, can be used.

Figure 6:
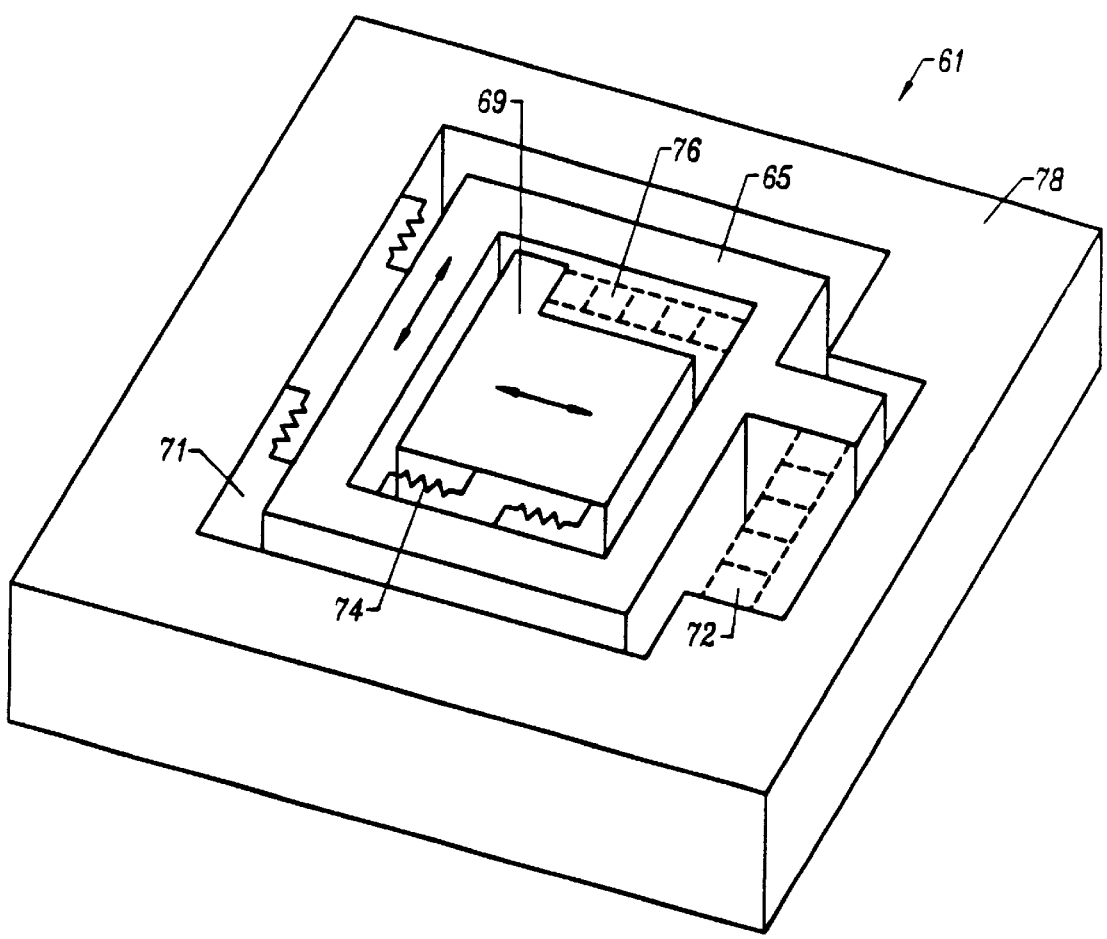
FIG. 6 illustrates an embodiment of a single-plate biaxial flexure stage which provides motion in a two translational directions.

FIG. 6 illustrates an embodiment of a single-plate biaxial flexure stage which provides motion in two translational directions. The single-plate biaxial flexure stage 61 illustrated in FIG. 6 includes an outer frame 78 and two inner portions 65 and 69 which are interconnected via machined-in spring elements 71 and 74 which provide restoring forces. Piezoactuator 72 pushes inner portion 65 relative to fixed outer frame 78 to move inner portion in the x direction. Likewise, piezoactuator 76 pushes inner portion 69 relative to inner portion 65 in the y direction. The net effect of this motion is that inner portion 69 is translated in both the x and y directions.

Scanning in the x-y plane is preferably accomplished in the SPMs and SPM heads of the present invention by using either a single-plate biaxial flexure stage, such as the one illustrated in FIG. 6, or by using a stacked flexure stage formed from two orthogonally mounted flexure stages, such as the one illustrated in FIG. 5, which each provide motion in a single translation direction.

Figure 7:
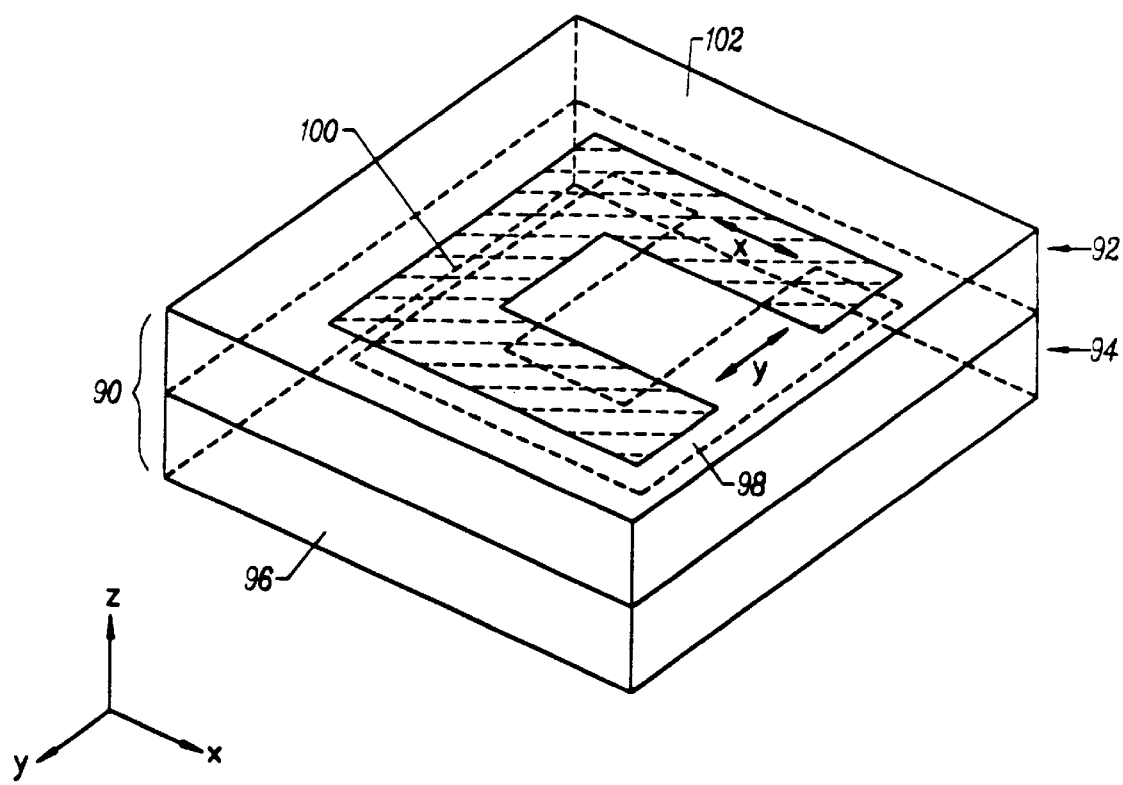
FIG. 7 illustrates a stacked x-y flexure stage.

FIG. 7 illustrates a stacked x-y flexure stage 90. As illustrated, the x-y flexure stage 90 includes a flexure stage 92 for providing motion along the x axis and a flexure stage 94 for providing motion along the y axis. The outer frame 96 of the y flexure stage 94 is fixed in space and the inner portion 98 of the stage can be moved along the y axis. Meanwhile, the inner portion 98 of the y flexure stage 94 is attached to the inner portion 100 of the x flexure stage 92. The outer frame 102 of the x flexure stage 92 can be moved along the x axis relative to the inner portion 100. By coupling the movement of the inner portion 98 of the y flexure stage 94 to the inner portion 100 of the x flexure stage 92, the outer frame 102 of the x flexure stage 92 can be moved along both the x and y axes relative to the outer frame 96 of the y flexure frame.

A single actuator, preferably a stacked piezoactuator, is used with each of the x and y flexure plates to provide a scanning motion along the x and y axes. The design of the flexure stages provides a mechanical amplification of about 10:1; i.e., for a certain extension/contraction of a piezoelectric actuator, the outer frame 102 is moved a distance 10 times greater.

One of the advantages of x-y flexure stages is that they produce a highly planar scan in the x-y plane without appreciable bowing. As a result, it is possible to use a scan stage oriented for motion along the z axis which is off center relative to the center of movement of the x-y scanning stage without having x-y scan motion introduces errant motion in the z direction. Typical maximum x-y scan sizes using a stacked x-y flexure stage of this invention are from 100 μm to 200 μm, with z ranges of 10 μm to 20 μm and bowing motion on the order of only a few tens of millimeters (approximately 50 nm at full scale, with the z stage displaced from the center of x-y translation by about 3"). This is a tremendous improvement over existing SPM scanners, providing great flexibility to choose a scan size for SPM imaging.

The use of a stacked x-y flexure stage is preferred over a single plate biaxial flexure stage in view of the higher linearity of the scan that is provided. Stacked x-y flexure stages have been found to produce nearly orthogonal motion in the x-y plane (about 2° or less which is better than the performance of single plate biaxial flexure stages). Stacked x-y flexure stage also minimize cross-coupling between the x, y, and z axes by mechanically decoupling motion in these directions.

Figure 8:
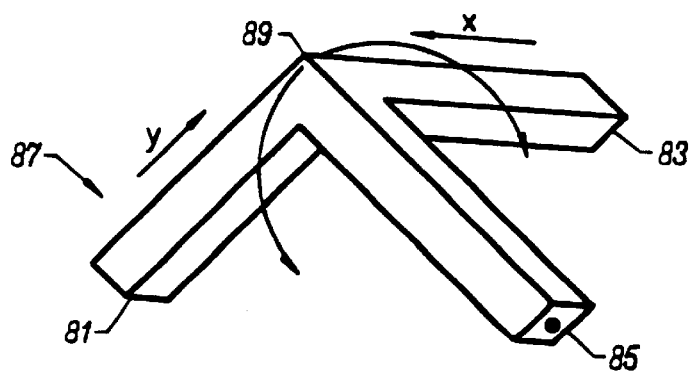
FIG. 8 illustrates a tripod scanner.

Tripod scanners and piezoelectric tube scanners have traditionally been used in SPMs. As illustrated in FIG. 8, the three legs 81, 83, 85 of a tripod scanner 87 are joined at the apex 89. As a result, scanning motion provided by a tripod scanner in the x, y, and z directions is highly coupled. If single-element piezoelectrics are used for each leg (U.S. Pat. No. 4,908,519, tripod scanners have a small throw, or maximum range of extent. The throw provided by a tripod scanner can be increased by using stacked piezoelectric elements. However, x, y, and z coupling increases with increased throw. Tripod scanners also have the disadvantage of being too weak to carry large loads, since they have little shear strength.

Figure 9B:
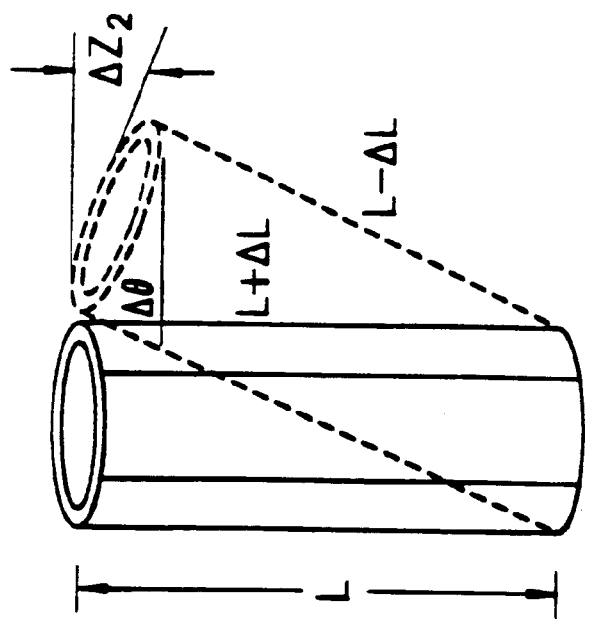
FIGS. 9A–9B illustrate two sources of z displacement during the scanning motion of a piezoelectric tube scanner.
Figure 9A:
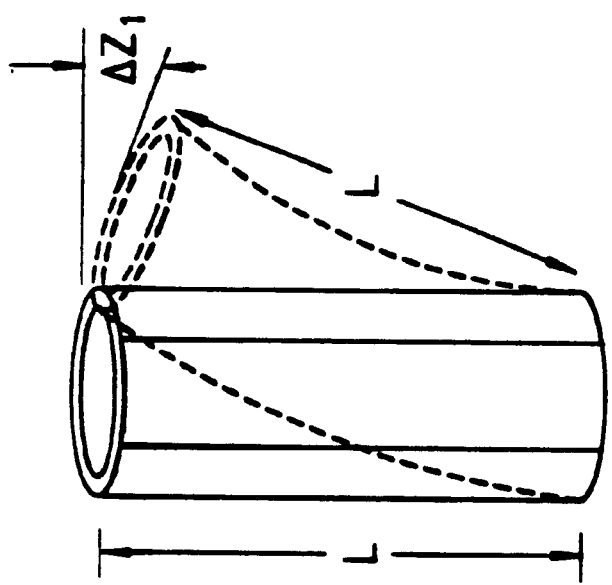

The scanning motion of a piezoelectric tube scanner is illustrated in FIGS. 9A–9B. As illustrated, tube scanners also exhibit x, y, and z coupling and a non-planar x-y scanning motion. G. Binnig and D. P. E. Smith, *Rev. Instrum.*, 57, pp. 1688 (1986). The x, y, and z coupling observed in a tube scanner is due, in part, to the fact that the scanner scans in an arc which is determined by the tube's length. The tube scanner's bowing motion shown in FIG. 9A produces cross-coupling between x-z and y-z motion that shows up as curvature in an SPM image. The wider the scan in x and y, the greater the amount of bowing, which increases approximately quadratically with distance from the center of the scan.

The x, y, and z coupling observed in tube scanner is also due a push/pull effect illustrated in FIG. 9B in which opposite sides of the tube contract or extend during motion in the x-y directions, thus producing out-of-plane tilting. The amount of z displacement observed is also a function of the displacement of the tube scanner from the center of (x,y) motion.

The z scanner must generally compensate for changes in the probe's position along the z axis due to nonplanar scanning motion by the probe along the x and y axes. As a result, a portion of the scan range along the z axis must be reserved to perform this correction which ultimately limits the maximum z range available to scan a sample's topography. Consequently, the entire z range of the tube scanner is not available to image sample topography. For example, if a probe were mounted 3 inches off the center of x-y motion on a tube scanner, it would not be possible to scan 100 μm in the x or y direction because the z range of the scanner would not be sufficiently great to compensate for the bowing introduced by the tube scanner.

The length of tube scanners has the further disadvantage of limiting how closely optical components can be brought to the probe and sample. Use of an x-y flexure stage provides a lower height profile than a tube scanner and reduces constraints on the positioning of objective and condenser lenses relative to the sample and probe.

X-Y Flexure Stage with Off Center Z Scanning Stage

Another important aspect of the present invention is the use of z scanning stages which are positioned off center relative to a x-y flexure stage.

Z scanning stages in an SPM are typically located at the center of x-y motion of an x-y scanning stage in order to decouple any non-planarity in the x-y scan from the z scan. A scanner with a z scanning stage positioned at the center of x-y motion has the additional advantage of being easy to build.

Figure 10:
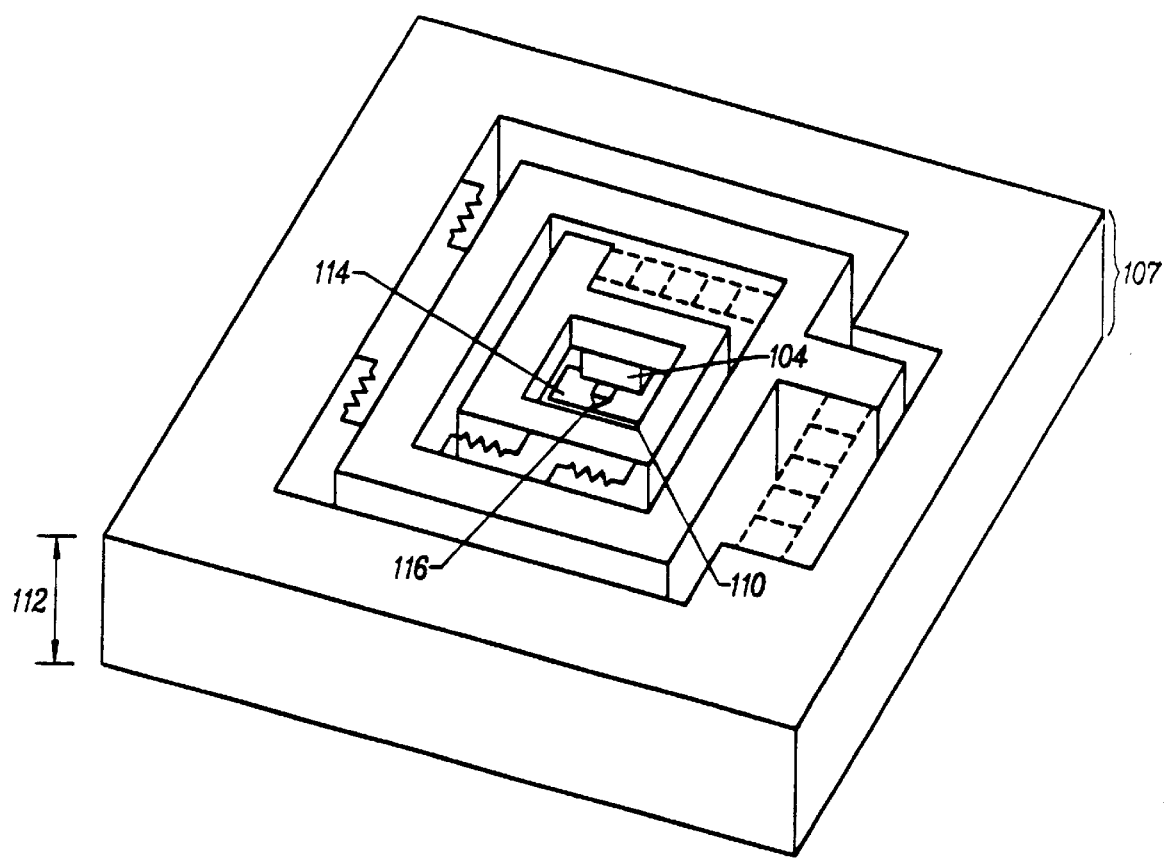
FIG. 10 illustrates the positioning of a z scanning stage at the center of motion of an x-y scanning stage.

As illustrated in FIG. 10, one problem associated with positioning a z scanning stage 104 at the center of motion of an x-y scanning stage 107 is that it is necessary to make a hole 110, in the x-y scanning stage 107 in order to view the sample 114 and the probe 116.

Since the working distance of a standard objective lens and also of condenser lenses used in inverted optical microscopes is on the order of 20 mm, the thickness 112 of a x-y scanning stage 107 limits how closely an objective lens or illumination source can be brought relative to a sample 114 or a probe 116.

The problem of not being able to bring objective lenses into close proximity with the sample or probe can be overcome by using a longer working distance lens. However, such non-standard lenses are more expensive and produce a lower quality optical image. The hole 110 in the x-y scanning stage 107 can also be made large enough to accept a standard long working distance objective. However, since the diameter of the lens is typically on the order of 1¼", increasing the width of the hole 110 in the x-y scanning stage 107 in order to accommodate an objective or condenser lens causes the lateral footprint of the x-y scanning stage 107 to be increased. Increasing the lateral footprint of the x-y scanning stage, in turn, requires that the piezoactuators and the feet of the stage be moved further apart. In an SPM, a small lateral footprint is more desirable because it decreases the mechanical loop of the system, thus providing greater mechanical stability. By enlarging the lateral footprint of the stage in order to accommodate an objective lens, the performance of the SPM may be compromised.

The hole in the center of the x-y scanning stage may also serve to facilitate access to the sample and probe for manipulation by a variety of tools. However, access to the sample and probe through the hole requires that the tools be operated at high angles relative to the plane of the sample and with a blocked or impaired optical view. As a result, the configuration illustrate d in FIG. 10 where the x-y scanning stage includes an access hole is not highly compatible with micromanipulations of samples which require a simultaneous optical view.

In the present invention, as illustrated in FIGS. 1–4, the use of a highly planar x-y flexure stage, in contrast to piezoelectric tube scanners and tripod scanners, enables a separate z scanning stage to be used which is positioned off the center coordinates of x-y motion (0,0) and more preferably outside the lateral footprint of the x-y flexure stage. Since the z scanning stage may be mounted off to the side of the x-y flexure stage, the probe can be mounted in a position relative to the x-y stage where top down and bottom up optical views of the probe and sample are not obstructed by the x-y stage. In addition, the configuration of the z scanning stage off center enhances access to the sample and probe.

Z Flexure Stages

The SPMs and SPM heads of the present invention may also include a flexure stage which provides scanning motion along the z axis.

Figure 11:
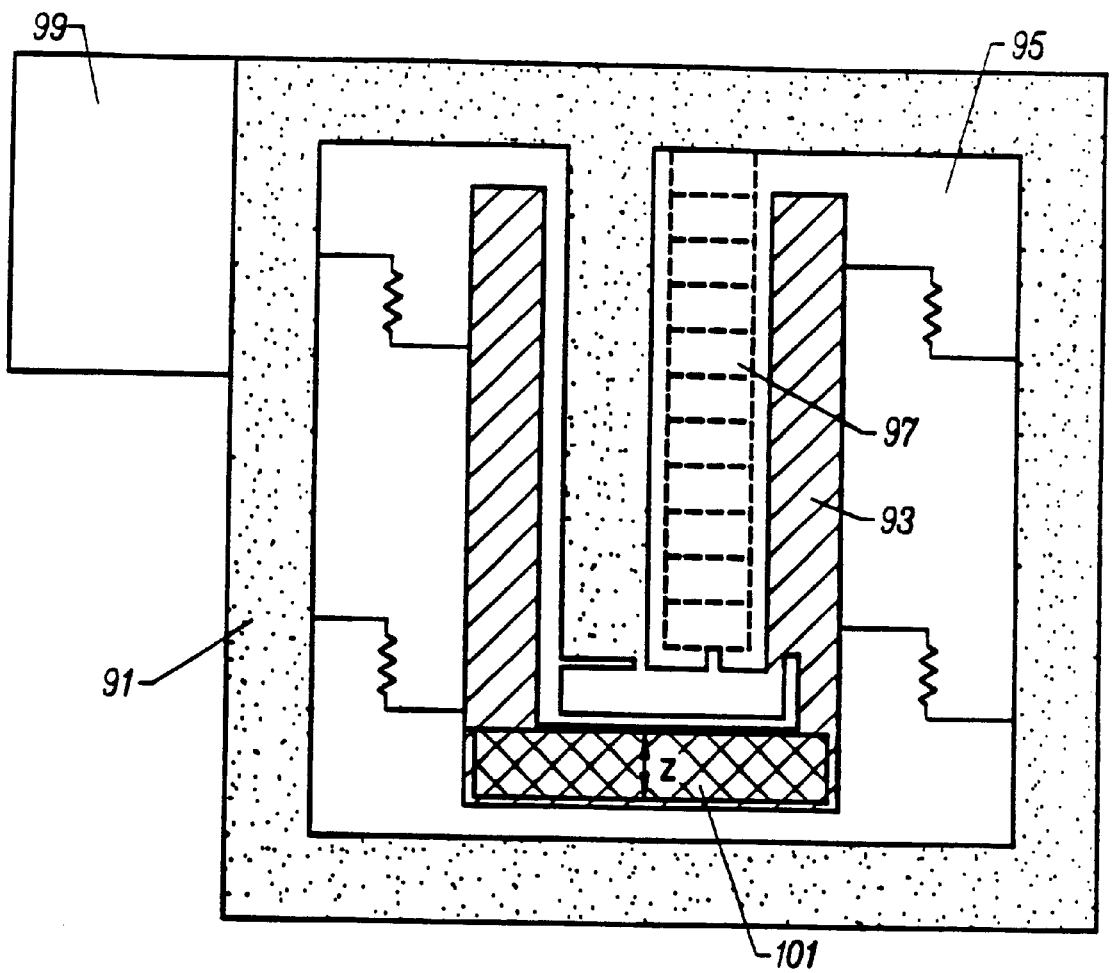
FIG. 11 illustrates an embodiment of a z flexure stage.

An embodiment of a z flexure stage is illustrated in FIG. 11. As illustrated, the stage includes a fixed portion 91 and a moving portion 93 which is attached to the fixed portion 91 by spring elements 95. An actuator 97, illustrated as a stacked piezoactuator, pushes moving portion 93 relative to fixed portion 91. A bracket 100 for mounting a probe (not shown) on the z flexure stage and a bracket 99 for mounting the z flexure stage on the x-y scanning stage may be attached to the z flexure stage. A z flexure is used to drive a high load at relatively high speeds.

In another embodiment, multiple z flexure stages are attached to the x-y stage in order to incorporate multiple probes onto the SPM or SPM head for simultaneous probing and/or processing. For example, multiple probes are useful for performing nanolithography since multiple areas can be processed in parallel. In a preferred variation of this embodiment, the multiple z flexure stages are positioned outside the lateral footprint of the x-y scanning stage as described below.

Off-Center Z Flexure Stage

In a preferred embodiment of the invention, the z flexure is positioned off the center of the x-y translation of the x-y scanning stage. Several configurations of a x-y scanning stage with a z flexure positioned off-center can be envisioned and are intended to fall within the scope of this invention. In a particularly preferred embodiment, the z flexure is positioned outside the lateral footprint of the x-y stage.

Figure 12:
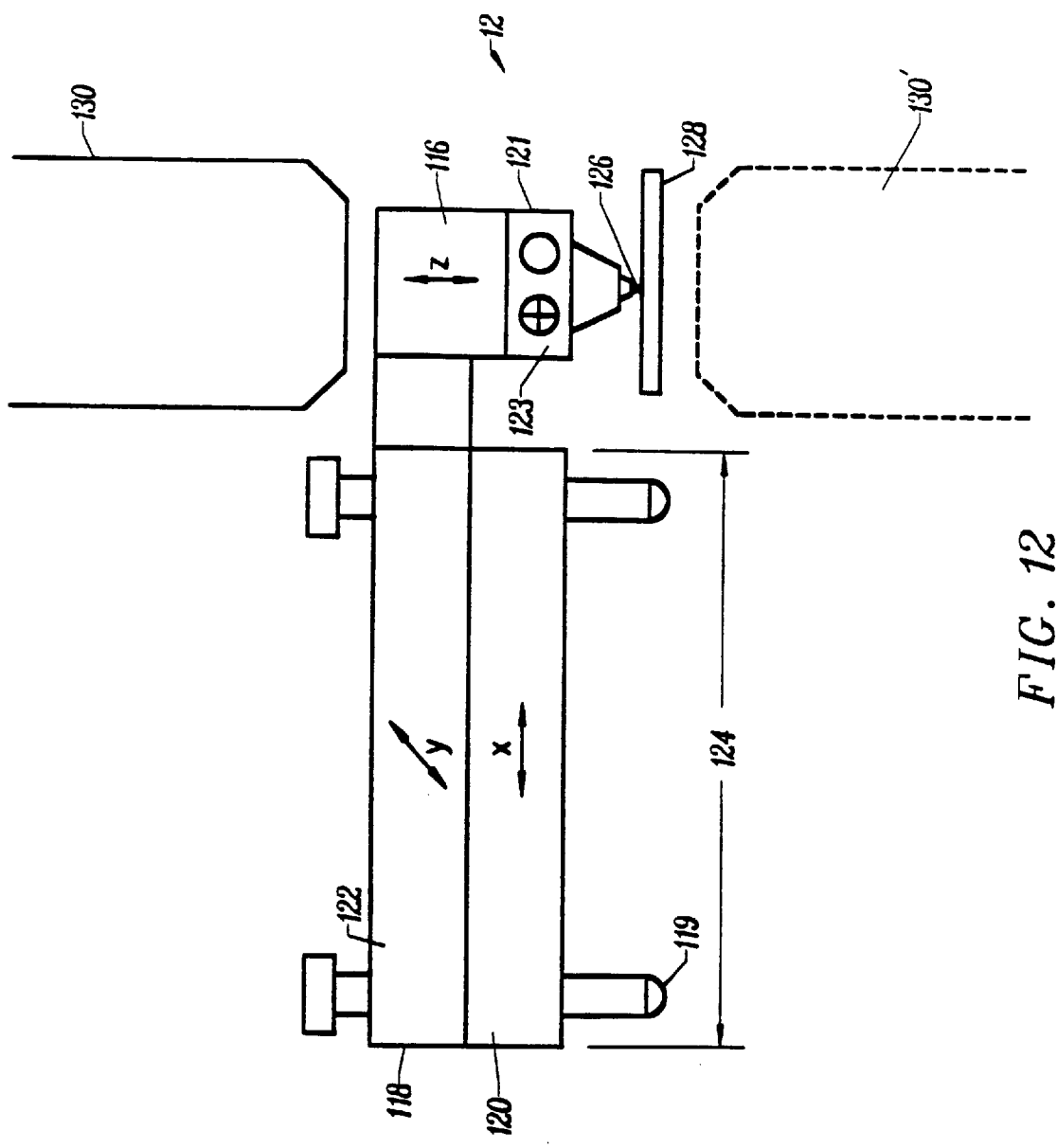
FIG. 12 illustrates a lateral view of an SPM head where the z flexure stage is positioned outside the lateral footprint of the x-y scanning stage.

FIG. 12 illustrates a lateral view of an SPM head where the z flexure stage is positioned outside the lateral footprint of the x-y stage. As illustrated, SPM head 12 includes an z flexure stage 116 which is attached to an x-y scanning stage 118 having legs 119. A bracket 121 carrying a probe 126 and a detection system 123 is mounted on the z flexure stage.

The x-y scanning stage 118 is illustrated in the figure as a stacked x-y stage including x flexure stage 120 and y flexure stage 122. In addition to a stacked x-y flexure stage or a single plate biaxial x-y flexure stage, any another type of x-y scanning stage which provides a highly planar scan along the x-y plane can be used.

Stacked x-y flexure stages provide an advantage over single plate biaxial x-y flexure stages of being more readily designed with a smaller lateral footprint. This smaller footprint provides the stacked x-y stage with greater mechanical stability and makes the stage less susceptible to thermal drift. Stacked x-y flexure stages also exhibit greater decoupling in the x, y, and z scan directions than biaxial x-y flexure stages and thus provide more highly planar and orthogonal scans. In addition, two identical stacked uniaxial flexure plates are less expensive to manufacture than a biaxial flexure stage.

As shown in FIG. 12, the z flexure stage is positioned outside of the lateral footprint 124 of the x-y scanning stage 118. A probe 126 is attached to the z flexure stage 116 which extends over a sample 128. The probe is also preferably outside of the lateral footprint of the x-y scanning stage 118 and is preferably also outside the lateral footprint of the z flexure stage.

As illustrated in FIG. 12, by attaching the z flexure stage 116 outside of the lateral footprint 124 of the x-y scanning stage 118, an objective lens 130 may be readily positioned at a close working distance relative to the probe 126 and the sample 128. As also illustrated in this embodiment, the objective lens 130 may be positioned above or below 130' the probe 126 and sample 128 to provide unobstructed top down and/or bottom up optical views of the probe 126 and sample 128. A condenser lens could alternatively be positioned where objective 130 is located.

In addition to providing unobstructed top down and/or bottom up optical views, designing the stage so that the z flexure stage is outside of the lateral footprint 124 of the x-y scanning stage 118 enables enhanced access to sample for manipulating the sample under simultaneous optical viewing.

For a given throw in x, y, and z, a scanning stage of the present invention which includes a stacked x-y flexure stage coupled to a z flexure stage has a lower height profile than a tube scanner. For a given load, given voltage, or given profile, this scanning stage provides a larger throw relative to tube scanners or stacked piezoelectric actuators alone.

The typical load that may be supported by this scanning stage, including the mass of the cantilever, the optical detector, and the laser alignment system, is about 50 g or more.

The bracket 121 used to attach the probe 126 to the z flexure stage may have a variety of configurations such as those illustrated in FIGS. 2 and 3. The bracket 121 may also be designed to include a detection system for the SPM or SPM head.

Optical Viewing

Commercially available optical microscopes generally collect images using either (or both) epi or transmitted illumination. Epi illumination means that the image is collected from light that is reflected, scattered, or emitted (in the case of fluorescence) from the sample. When epi illumination is used, the illumination source and the objective lens are on the same side of the sample. The objective may be used for both illuminating the sample and collecting the image. Upright optical microscopes generally provide epi illumination and can also provide Kohler illumination.

Transmitted illumination means that the light source and the objective are on opposite sides of the sample, so that light collected for the image has been transmitted through the sample. This is also known as Kohler illumination. Inverted optical microscopes generally provide transmitted or Kohler illumination, but can provide epi illumination as well, by using the inverted objective lens to provide both illumination and image collection.

As described above, the SPMs and SPM heads of the present invention are designed to enable unobstructed viewing from both above and below the probe and sample. When x, y and z flexure stages are employed, the scanning stage also provides a sufficiently short working distance to enable standard long working distance lenses to be used. As a result, an objective lens and an illumination source may be positioned relative to probe and sample to provide either epi or transmitted illumination with simultaneous probe scanning.

In a preferred embodiment, both a condenser lens and objective are used, above and below the plane of the sample, respectively, and centered roughly around the probe position, for Kohler illumination and for collection of transmitted light using an inverted optical microscope. In this inverted configuration, the condenser lens supplies high intensity light, which is transmitted through a translucent or transparent sample and collected by an objective underneath. In both the upright and inverted configurations, the objective lens both illuminates and receives light scattered back from the sample. Upright optical microscopes using epi illumination do not require samples to be transparent.

The design of the SPMs and SPM heads of the present invention enable simultaneous probe-scanned SPM with an unobstructed optical view obtained without the assistance of a mirror. Also enabled is simultaneous probe-scanned SPM and epi illumination using standard commercially available upright optical microscope. Also enabled is simultaneous probe-scanned SPM and transmitted illumination using standard commercially available inverted optical microscope. Also enabled by the design of the SPMs and SPM heads of the present invention is simultaneous probe-scanned SPM and all the optical modes provided by standard commercially available inverted optical microscopes.

Detection System

The SPMs and SPM heads of the present invention may incorporate a wide variety of detection systems used in combination with a probe for probing a surface. The particular detection system incorporated into an SPM or SPM head depends on the type of probing to be performed. As discussed above, the SPMs and SPM heads of the present invention may be used to perform any type of scan probe microscopy including, but not limited to contact atomic force microscopy (AFM), non-contact AFM, lateral force microscopy (LFM), scanning tunneling microscopy (STM), magnetic force microscopy (MFM), scanning capacitance microscopy (SCM), force modulation microscopy (FMM), electrostatic force microscopy (EFM), and other modes of operating a scanning probe microscope. The detection system incorporated into the SPM and SPM head is preferably selected to be particularly well suited for the type of microscopy to be performed.

Figure 13B:
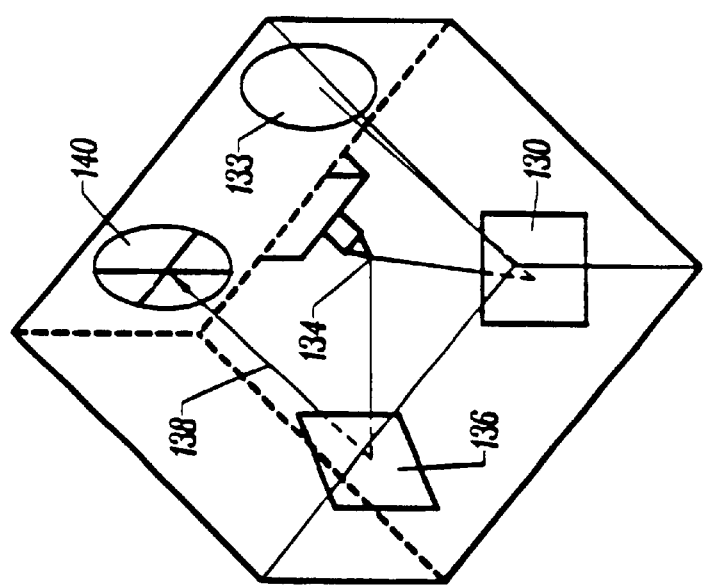
FIGS. 13A–B illustrate a dual mirror optical deflection detection system.
Figure 13A:
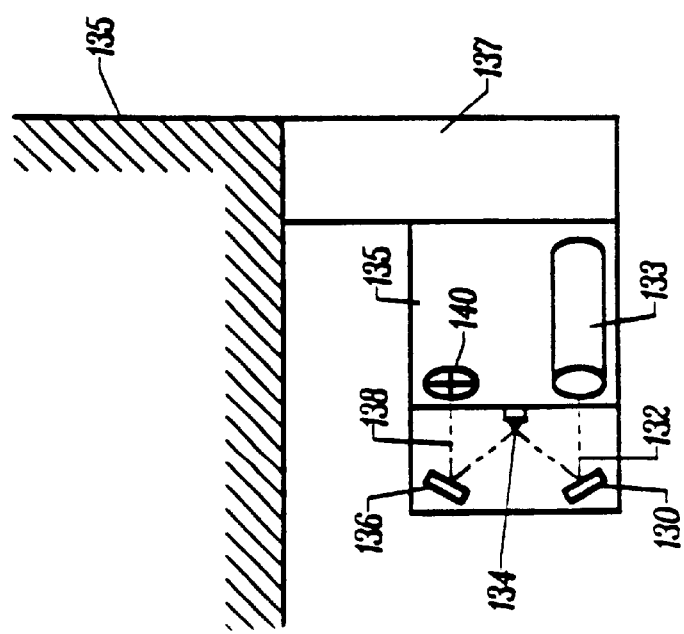

In a preferred embodiment of the present invention, the detection system employed is a dual mirror optical deflection detection system. It should be noted, however, that a variety of other detection mechanisms may be used, including, but not limited to piezoresistive capacitive and the like. As illustrated in FIGS. 13A–13B, the detection system includes two steerable mirrors, one mirror 130 to steer the laser beam 132 from laser 133 onto the cantilever 134, and the second mirror 136 to steer the reflected beam 138 onto the detector 140. The detection system is mounted on a z flexure stage 137 by bracket 135.

The two mirrors 130,136 may each be steered by mechanisms which are well known in the art.

As illustrated in FIGS. 13A–13B, the laser 133 in this detection system is horizontal, i.e., approximately parallel with the x-y plane. This orientation minimizes the laser's dimensions along the z axis. Since the laser 133 is long (about 20 mm), mounting the laser vertically directly over the probe, as illustrated in FIG. 14A, would block the use of a standard long working distance objective 139. If the laser 133 were oriented vertically but offset from the probe, as shown in FIG. 14B, at least two mirrors 141, 142, one of them a beamsplitter, would be necessary to steer the laser beam 132 onto the back of the cantilever probe 134 to produce a top down view. The laser can also be tilted relative to the z axis so that a mirror would not be necessary to steer the laser beam onto the cantilever. However, this orientation increases the height profile relative to the perfectly horizontal.

Laser light reflected from the cantilever probe 134 is directed approximately horizontally towards a position-sensitive photodetector 140 from the second mirror 136. The position-sensitive photodetector 140 is preferably mounted vertically relative to the x-y stage, as illustrated in FIG. 13B in order to detect vertical displacement of the laser beam on the photodetector 140.

In one embodiment, a quad-cell position-sensitive photodetector (PSPD) is used as the photodetector which allows deflection detection for all the SPM modes, both contact and non-contact, including lateral force microscopy (LFM). With provision for biasing or grounding the tip, STM and EFM is also possible. A bi-cell photodetector could also be used to detect cantilever displacement but it would not allow LFM operation as well.

With the design for the dual mirror optical deflection detection system, as illustrated in FIGS. 13A–13B, the diameter of the laser 133 and the photodetector 140 are the limiting factors with regard to the height profile of the detection system, as illustrated in FIG. 15. In general, the diameters of the laser 133 and the photodetector 140 are about 8 mm.

In order to reduce the height profile of the detection system, the laser 133 can be replaced with an optical fiber and the laser light reflected from the cantilever probe can be collected using a second fiber optic and a lens. This design could further reduce the height profile of the detection system down to a few millimeters. In this alternative configuration, mirrors 130 and 136 would still be needed to steer the laser beam onto the back of the cantilever and from the cantilever onto the photodetector.

In yet another embodiment, the laser and photodetector are moved in the x-y plane away from the probe in order to reduce the height profile of the detection system directly adjacent the probe thereby reducing the working distance for an objective or condenser lens.

An unique aspect of the dual mirror optical deflection detection system, as illustrated in FIGS. 13A–13B, is that the area above the cantilever probe 134 is unobstructed. This is made possible, in part, by the use of the two mirrors 130, 136 and laser 133 oriented horizontally relative to the x-y stage 135. As a result, the space substantially above the cantilever probe 134 is free for both illumination (for instance, by confocal microscopes, lasers, etc.) and for direct optical inspection. This configuration also allows the SPM to be combined with other inspection tools such as optical micrometers, optical scattering devices, and any inspection apparatus where it is necessary to view or access the sample from directly above.

Closed Loop Scanning System

Figure 16:
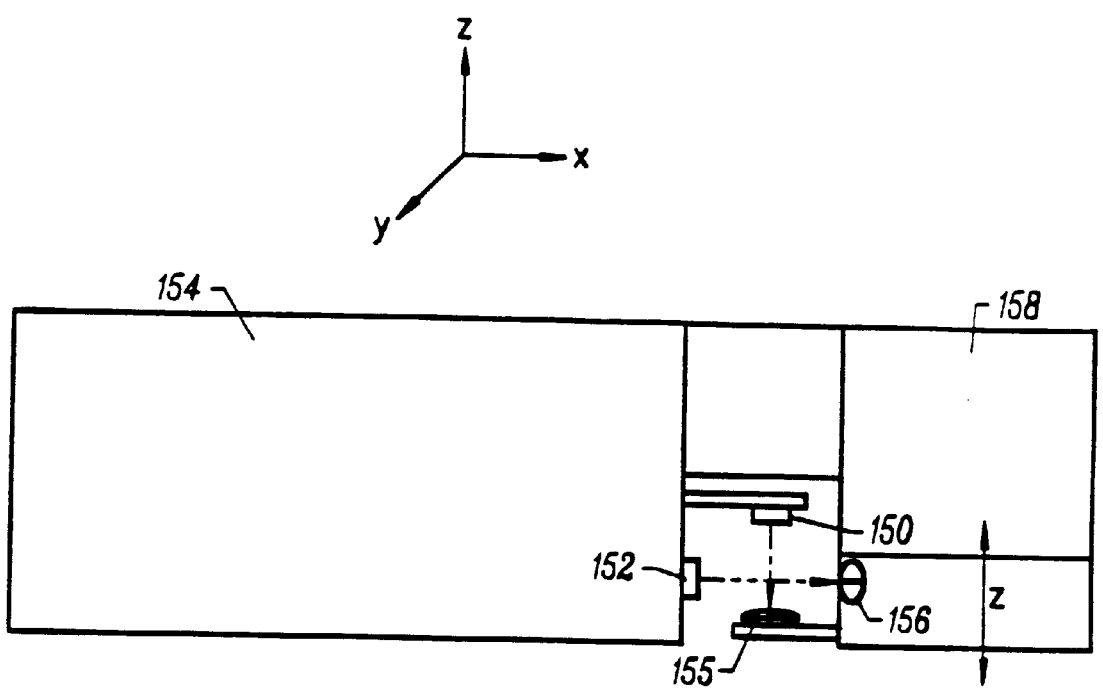
FIG. 16 illustrates the incorporation of a closed loop scanning system into the SPMs and SPM heads of the present invention.

FIG. 16 illustrates the incorporation of a closed loop scanning system into the SPMs and SPM heads of the present invention. As illustrated, two light emitting diodes 150, 152 are mounted on a fixed portion of the x-y flexure stage 154 facing two photodetectors 155, 156 which are mounted on the z flexure stage 158. One of the photodetectors 155 is a quad-cell position sensitive photodetector (PSPD) and is used to sense x-y positioning while the other photodetector 156 is a bl-cell PSPD and is used to sense the z positioning of the probe. Examples of electronics and design consideration that may be used to implement the closed loop scanning system are described in U.S. Pat. Nos. 5,376,790 and 5,210,410 which are incorporated herein by reference. Using this closed loop scanning system, scanning in x and y can be corrected in real-time for scanner nonlinearities such as creep and hysteresis. Z position detection also enables an image to be generated using the z detector signal.

Course Stage Adjustment

Figure 17:
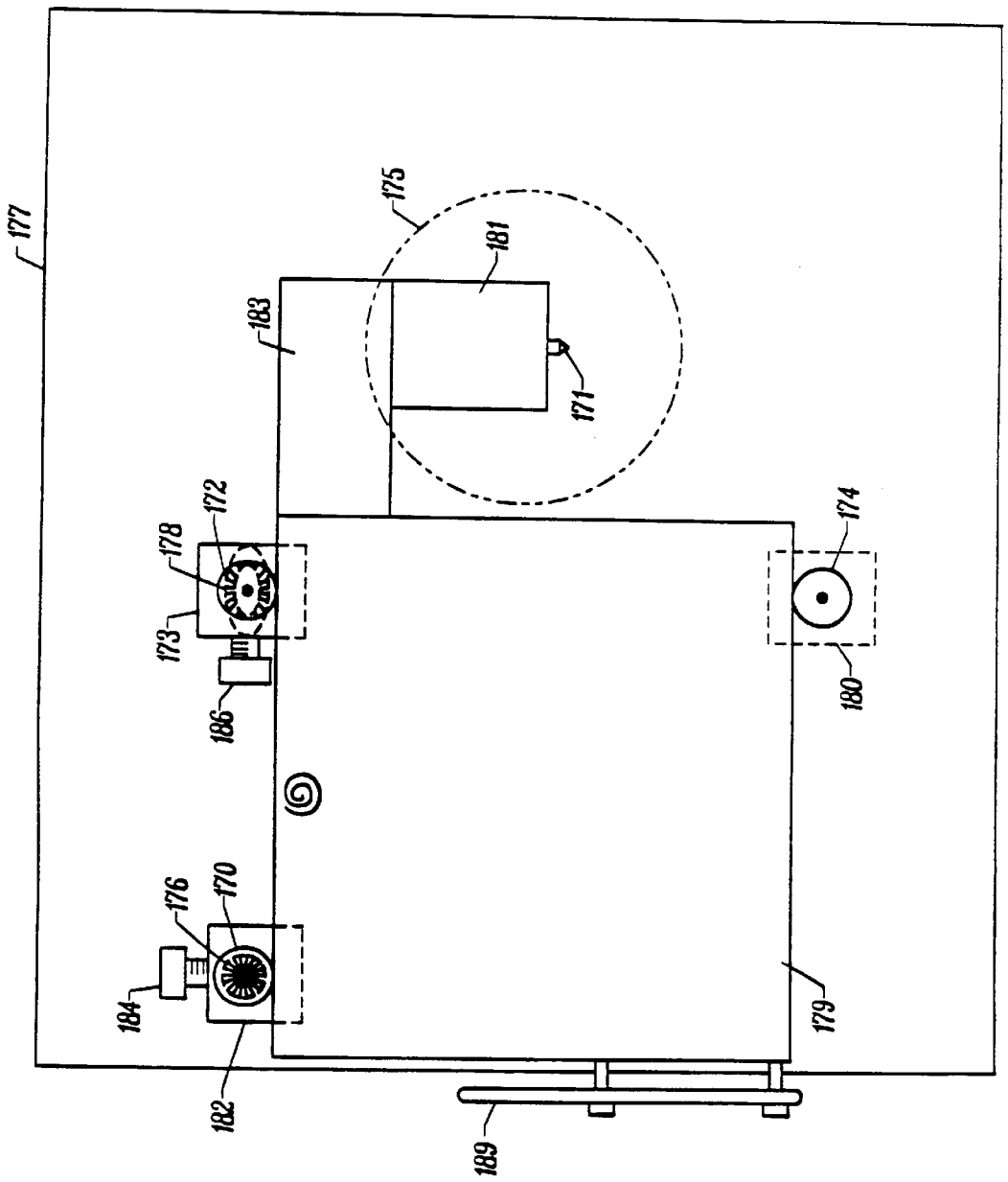
FIG. 17 illustrates a kinematically mounted SPM head on a coarse x-y mechanical stage.

An SPM or SPM head of the present invention may be kinematically mounted on a coarse x-y mechanical stage which enables alignment of the probe 171 within the field of view of an objective lens 175 of an upright or inverted optical microscope 177. As illustrated in FIG. 17, an SPM head, which includes an x-y scanning stage 179, a bracket 181, a z scanning stage 183, and a probe 171, is supported on three legs 170, 172, 174. The curved surfaces of the legs contact a cone 176, a slot 178, and a flat 180 located on an optical microscope stage plate 177 to form a kinematic mount which allows approximately orthogonal x-y translation. A further description of a kinematic mount such as the one illustrated in FIG. 17 is described in U.S. Pat. Nos. 5,157,251 and 5,376,790, which are incorporated herein by reference.

Manual translation in the x and y directions is produced by turning two thumbscrews 184, 186 located on the optical microscope plate 177, which push or pull guide pieces 182, 173 along dovetail tracks containing the cone and the slot. The coarse x-y stage can also be motorized.

Using the kinematic mount described above, existing upright and inverted optical microscopes may be readily retrofitted to be combined with an SPM or SPM head of the present invention by replacing the existing optical microscope stage plate with a stage plate modified to include kinematic mounting points and a mechanism for adjusting their position.

Figure 18A:
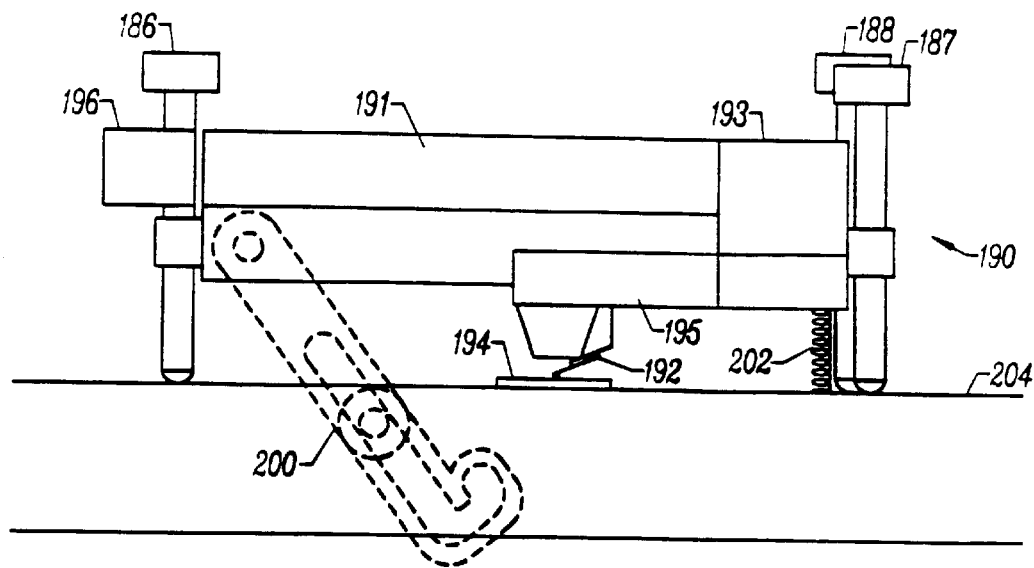
FIGS. 18A–B illustrate a mechanism for raising and lowering a SPM head relative to a stage.

As illustrated in FIG. 18A, the three supporting legs used in the kinematic mount may be formed of the ball-tips of three screws 186, 187, 188 which form a coarse z mechanical stage used to raise and lower the SPM head 190 in the z direction in order to perform a tip-to-sample approach. The design of the coarse stage adjustment allows for both a manual and automatic approach. The manual approach may be accomplished using all three screws 186, 187, 188 to lower the SPM head 190 (x-y flexure stage 191, probe 192, z flexure stage 193, bracket 195) until the probe 192 is in close proximity to but not touching the sample 194 (as determined by eye), and then using a single screw to further tilt the head until the probe is engaged. An automatic approach can also be performed which uses a motor 196 to turn on one of the screws to perform the same tilting action as in the manual approach. Alternatively, all three approach screws can be motorized using one or more z motors.

The motor 196 used for the z approach is preferably a piezoelectrically driven screw, such as PICOMOTOR™ from Nufocus, Inc. although other type of motors can be used. This type of inertial driven motor is small and compact, and provides a low profile, reduced weight, and high resolution (about 30 nm/step). The motor has no appreciable backlash in comparison to stepper motors which produce heat and vibrations leading to backlash.

Figure 18B:
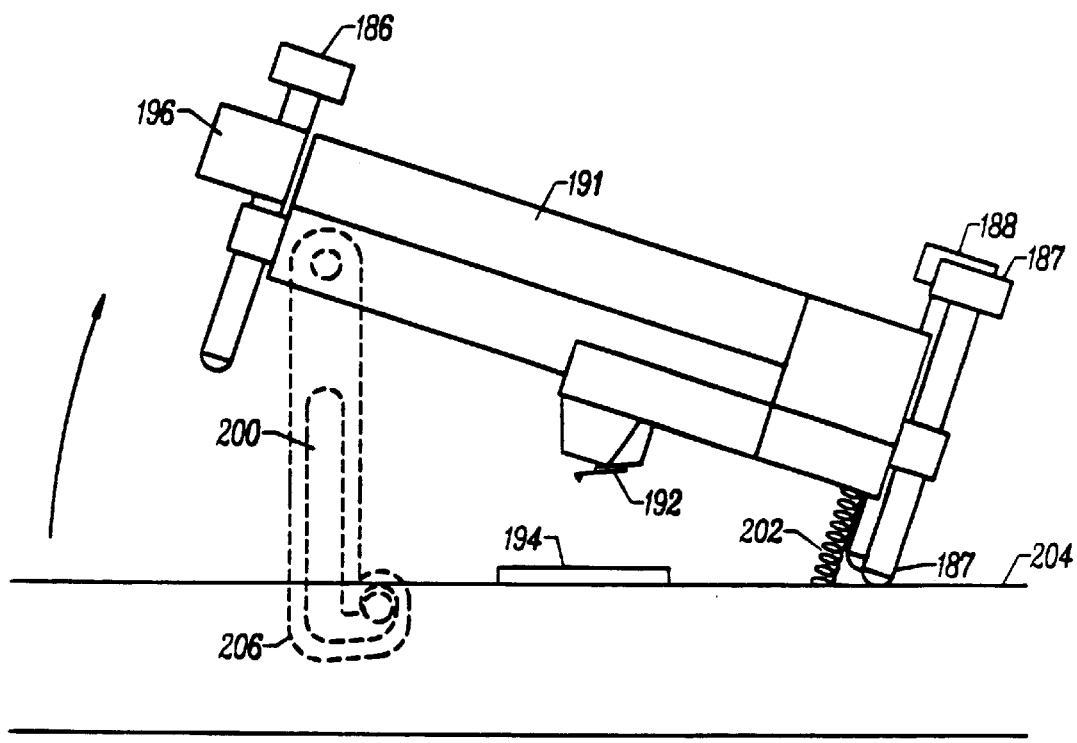

As illustrated in FIGS. 17, 18A–18B, the SPM or SPM head may also include a mechanism, referred to herein as a locking jack 189, which enables the user to lift and tilt the SPM head relative to the sample stage and lock the head into a raised position for quick access to the sample and probe.

As illustrated, the locking jack mechanism includes an arm 200 and a spring 202 which biases two or more legs (illustrated as screws 187, 188) against a surface on which the SPM head is placed, illustrated in FIGS. 18A–B as optical microscope stage 204. As illustrated in FIG. 18B, when one end of the SPM head is raised, two or more of the legs opposite the raised end act as pivot points. The arm 200 includes a locking mechanism 206 which holds the SPM head in the raised position.

The steps to lift the SPM head in order to replace the probe 192 include: (1) moving the objective or condenser lens from the space above SPM head; (2) tilting the SPM head upward until the locking mechanism of the locking jack engages; (3) removing the probe and replacing it; (4) disengaging the locking mechanism; and (5) lowering the SPM head until the legs contact the kinematic mounting points.

Because the legs of the SPM head are lowered onto kinematic mounting points on the optical microscope stage whose positions are not altered by the process of raising and lowering the SPM head, the probe may be readily replaced and/or the sample manipulated without having to adjust the position of the probe relative to the sample.

Sample Stage

Figure 19A:
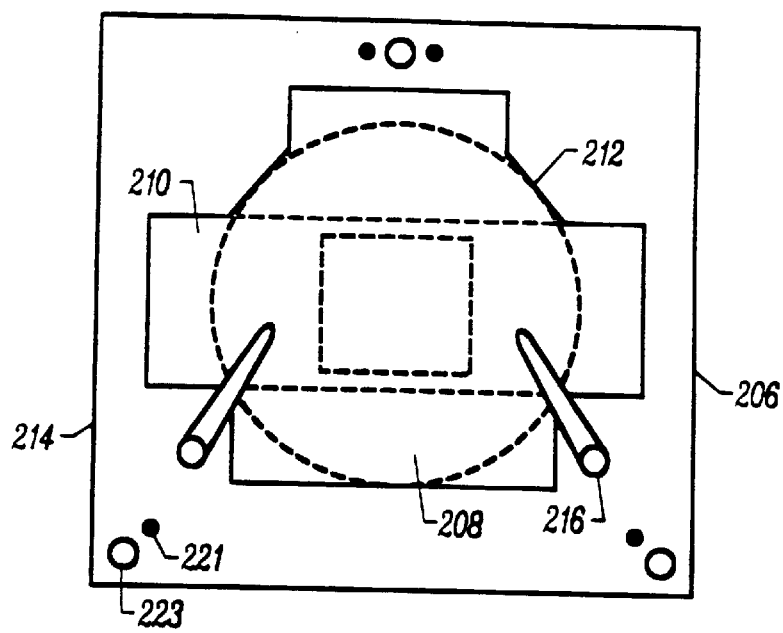
FIGS. 19A–19C illustrate embodiments of sample stages and sample stage holder designed for use in biological applications of scanning probe microscopy.
Figure 19B:
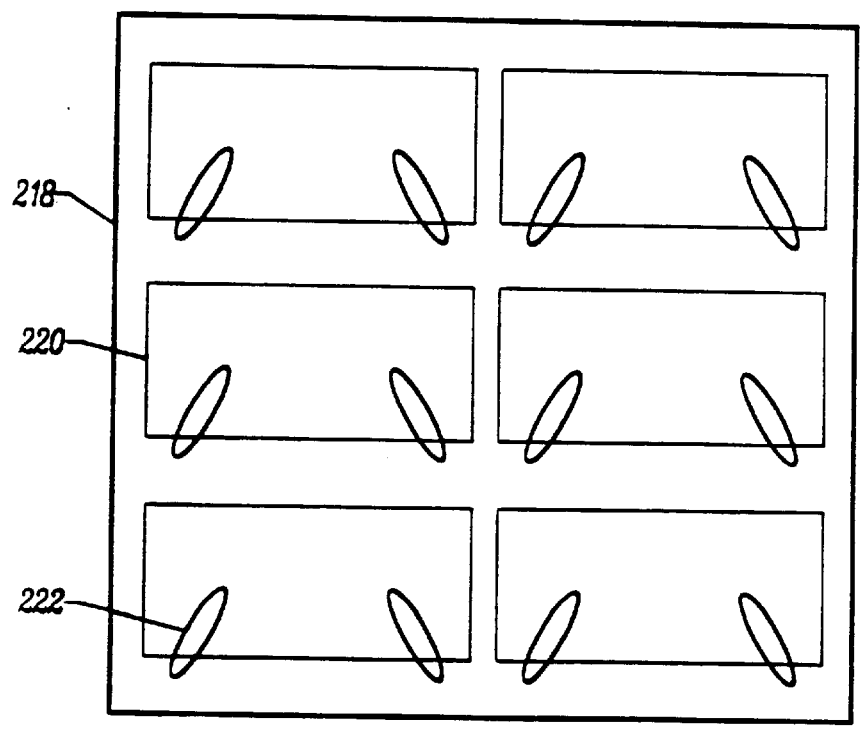
Figure 19C:
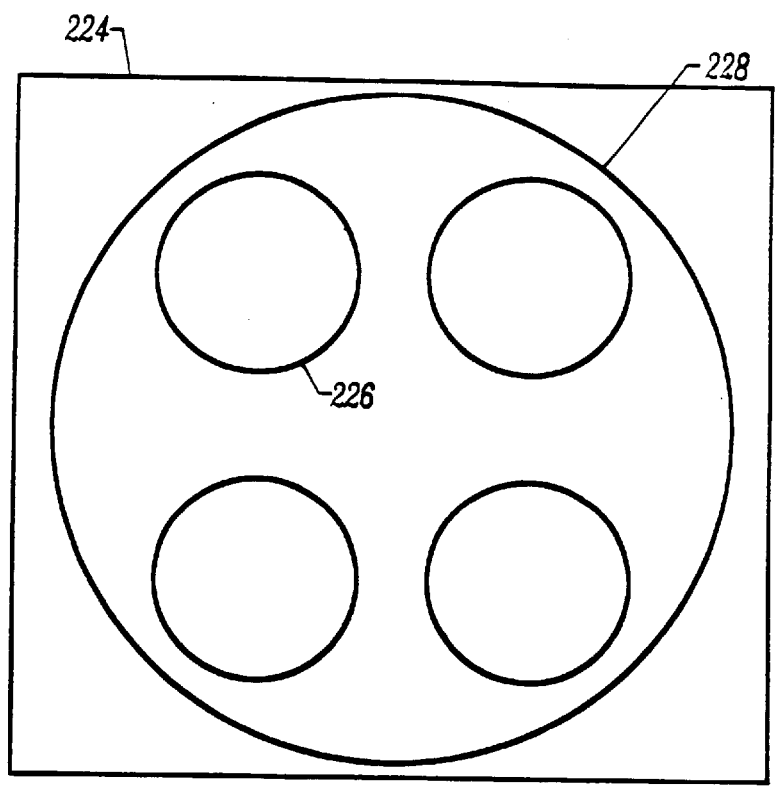

FIGS. 19A–19C illustrate embodiments of sample stages and sample stage holder designed for use in biological applications of scanning probe microscopy.

FIG. 19A illustrates a sample holder 206 which includes slots 208 and 210 sized to accommodate a coverslip or slide in addition to a depression 212 which is sized to accept a Petri dish. Two spring clips 214 and 216 secure a slide in slot 210. The sample holder could alternatively be designed to accommodate only a coverslip, a slide, or a Petri dish.

FIG. 19B illustrates a sample holder 218 which includes multiple slots 220 sized to accommodate a series of coverslips or slides. The sample holder 218 may also include spring clips 222 for holding slides in place.

FIG. 19C illustrates a sample holder 224 which includes multiple depressions 226 sized to accommodate a series of Petri dishes. In this embodiment, the multiple depressions are preferably positioned on a carousel-type wheel 228 which can move the different depressions into position for scanning or observing. Such a carousel-type wheel may also be used to move a series of slides or coverslips into position on sample holder 218 in FIG. 19B.

Figure 20A:
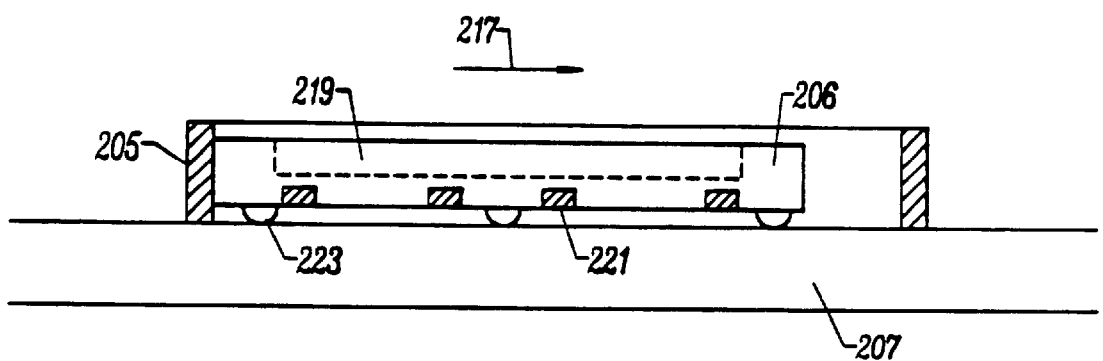
FIGS. 20A–B illustrate the sliding movement of a sample over a sample stage using a ring to push and pull the sample.
Figure 20B:
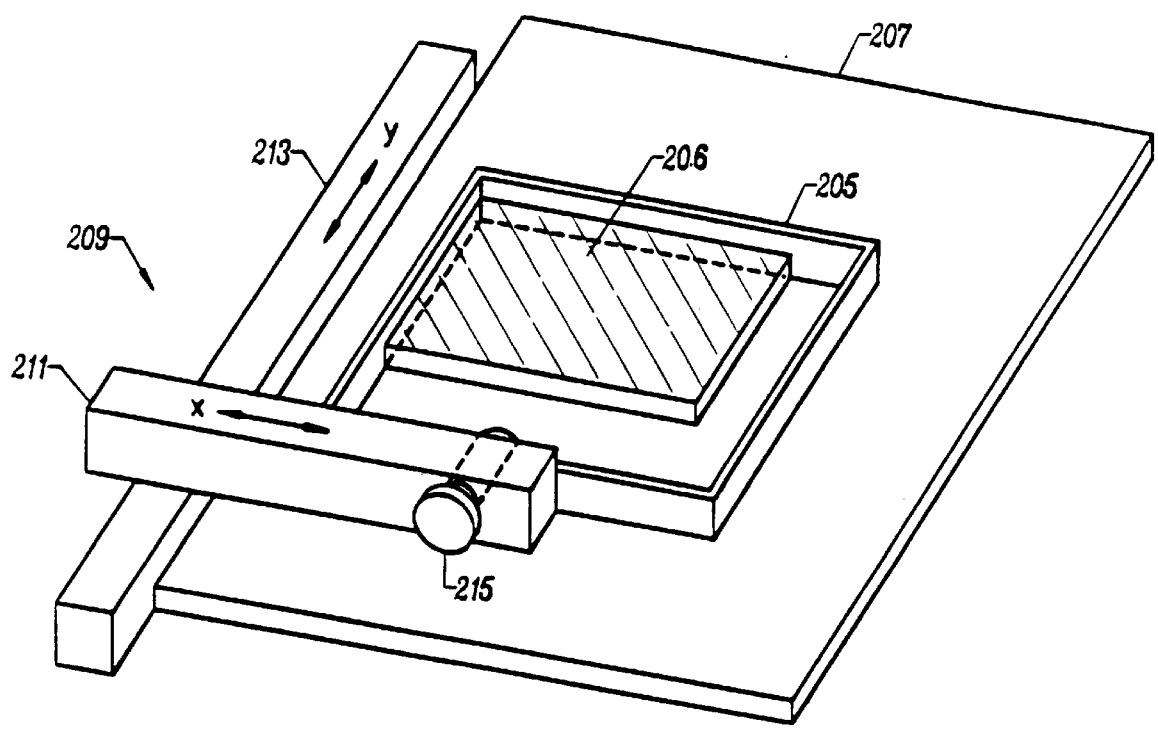

As illustrated in FIGS. 20A and 20B, sample holder 206 may be positioned within a ring member 205 which is slidable on optical microscope stage 207 or another sample stage. Ring member 205 fits around the sample holder 206, which may include a depression 219 which accepts a sample mounted on a coverslip, slide, or Petri dish. Ring member 205 is sized such that it is able to leave a gap along all the sides of the sample holder. By moving ring member 205, it is possible to move sample holder 206 in the x-y plane on optical microscope stage 207. Because the ring has larger dimensions than the sample holder, the translation mechanism has a high degree of play in it, so that the sample holder can be disengaged from ring member 205 for greater mechanical stability during SPM imaging.

Ring member 205 may be moved using a conventional x-y translation stage 209, for instance a dual rack and pinion stage such as in a Zeiss optical microscope, although any conventional translational stage can be used. In the embodiment illustrated in FIG. 20B, x-y translation stage 209 includes an x translation arm 211 mounted on a y translation arm 213. Ring member 205 is attached to the x translation arm via screw 215. When the x-y translation stage 209 is moved, ring member 205 pushes sample holder 206 in the x or y direction (or both) so that it slides in direction of motion 217.

The sample holder is secured to the base of the optical microscope using magnets 221 as shown in FIGS. 19A and 20A to provide stability during SPM imaging. Optical microscope stage 207 is magnetic stainless steel, and four magnets 221 are attached to the underside of the sample holder. Three balls 223 on the underside of the sample holder provide three points of contact (feet) to define a constant plane and also to reduce friction as the sample holder is translated in the x-y plane. The magnets are therefore not in physical contact with the base of the optical microscope. With a little sideways force, the magnetic force can be overcome and the sample holder can slide along the base of the optical microscope. Vacuum suction could also be used in place of magnets. Typically, Petri dishes are held onto the sample holder by gravity; the additional magnetic forces provide enhanced stability. Coverslips may be secured to the sample holder using vacuum grease.

Liquid Cell/Cantilever Chip Holder

An important application of the SPMs and SPM heads of the present invention is in the performance of scanning probe microscopy in with a sample immersed in liquid, which is especially useful for biological samples. Illustrated in FIGS. 21A–21C is a combined liquid cell/cantilever chip holder for use in an SPM or SPM head.

The liquid cell 210 illustrated is of a captured-drop type in which a drop of liquid 229 surrounds the probe 233 and sample 234 and is held by surface tension between a viewport 235 on the underside of the liquid cell 227.

Figure 21A:
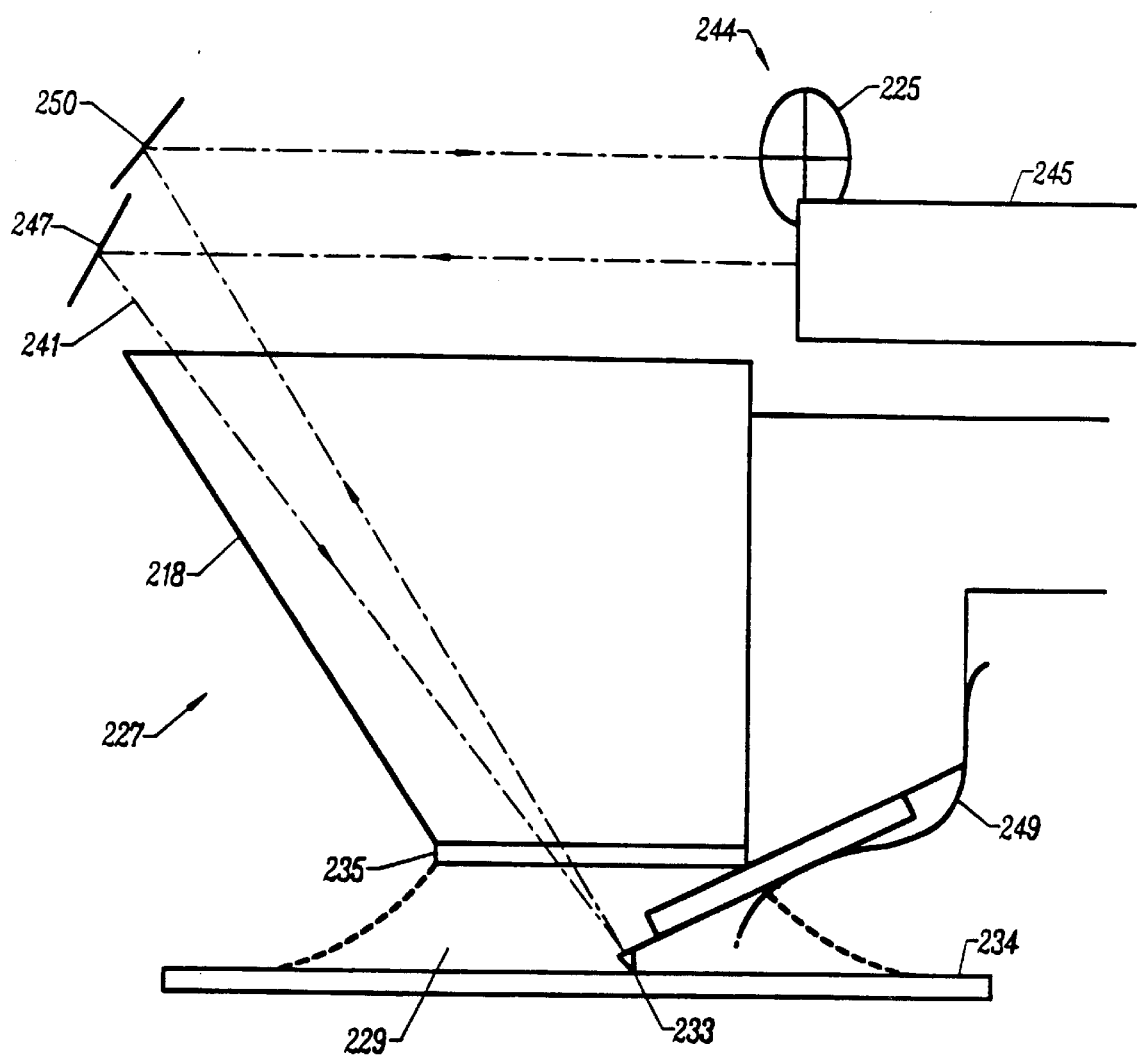
FIGS. 21A–21C illustrate a combined liquid cell/cantilever chip holder for use in an SPM or SPM head.
Figure 21B:
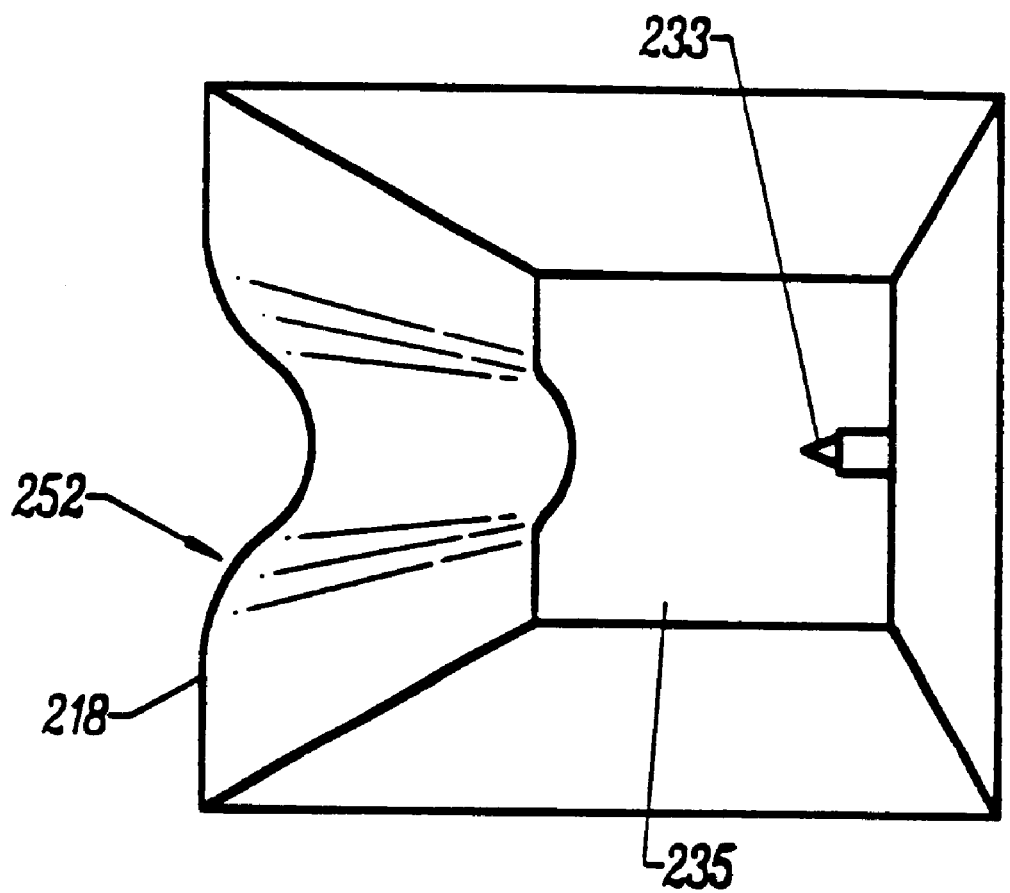
Figure 21C:
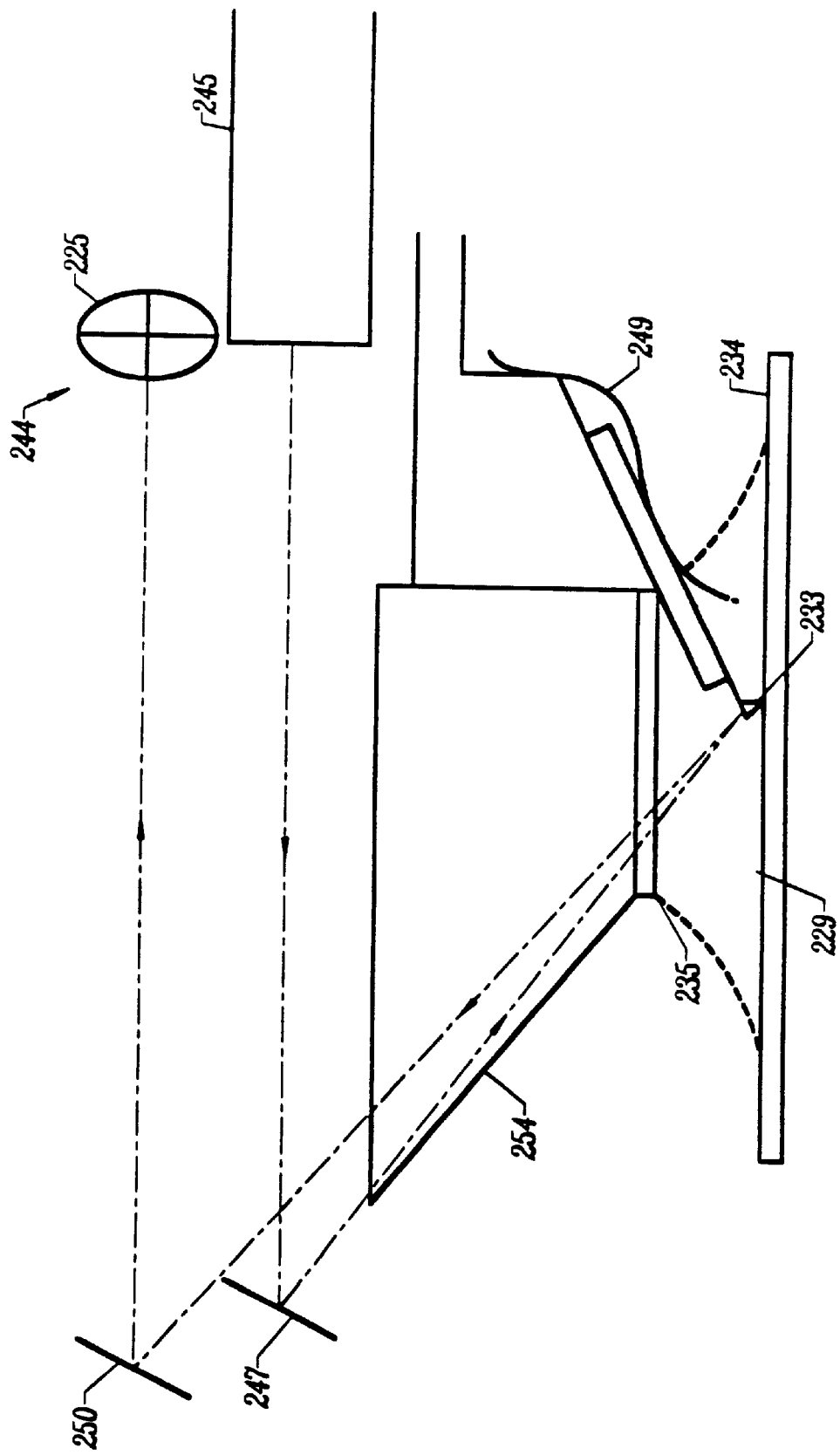

As illustrated in FIG. 21A, the liquid cell 227 includes walls 218 which are preferably sized to fit beneath a condenser lens or objective of an optical microscope. The walls 218 illustrated in the figure form a hollow square pyramid-shape. However, alternative shapes, for example a round (cone-shaped) liquid cell can be used. The walls serve to confine liquid to the outer surface of glass viewport 235.

At the bottom of the walls 218 include a viewport 235, generally glass, through which the cantilever probe 233 and sample 234 are viewed. The viewport 235 has very low replacement cost and can be removed for standard ambient imaging conditions.

The liquid cell 227 has a tapered design with a very small overhang above the cantilever probe 233 and sample 234 which gives the liquid cell 227 a small footprint for better access to the probe-sample area. It is desirable to provide convenient sample access for various instruments 237 such as micromanipulators, patch clamp pipettes, and other tools used for micromanipulation of cells. Without the tapered design, access to the sample from above would be blocked, and instruments used for micromanipulation of samples would need to be inserted sideways, which is inconvenient.

As illustrated in FIG. 21A, the tapered design of the fluid cell provides a clear path for the laser beam 241 of the deflection detection system 244 (laser 245, mirrors 247, 250, and photodetector 225) which passes through a viewport 235 and liquid 229 to the cantilever probe 233.

As illustrated in FIG. 21B, indentations 252 can be made along the length of the walls 218 to allow even easier access to the sample 234 using a long narrow tool.

As illustrated in FIG. 21C the liquid cell can be designed to be opened up laterally to allow decreased lens working distance. This embodiment is particularly useful if tools are not needed to manipulate the sample. In this embodiment, liquid cell walls 254 are slanted outwards making a smaller angle with the plane of the sample, and the components of the deflection detection system 244 (laser 245, mirrors 247, 250, and photodetector 225) are moved further back from the liquid cell walls. Opening up the liquid cell laterally in this manner (making it wider so that a lens can be brought closer to the probe) is one way to reduce the height profile and thus the working distance required. The height profile desired depends on the depth to which the liquid cell is intended to be submerged in liquid. For some applications, the liquid cell may be submerged in liquid to a depth of several millimeters, for instance in a Petri dish. The deeper the cell is to be submerged, the more height is needed for the walls of the liquid cell, to prevent liquid from spilling onto the opposite surface of the glass viewport, where any droplets can interfere with optical viewing and laser alignment.

The liquid cell could also include a shroud to prevent liquid evaporation. The shroud could be a flat ring or umbrella such as a rubber containment ring which surrounds the liquid cell to cover the liquid.

Kinematic Mount of Liquid Cell/Cantilever Chip Holder

Figure 22:
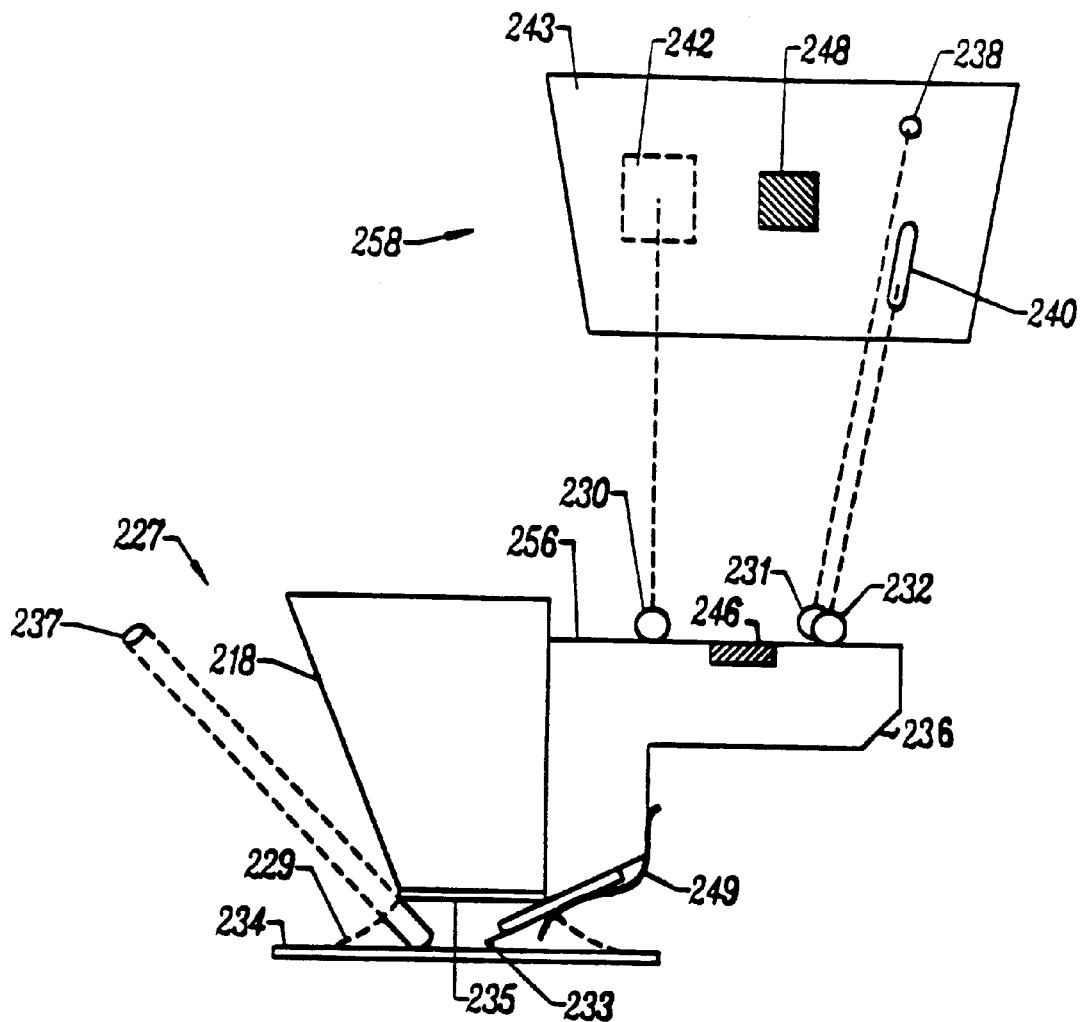
FIG. 22 illustrates a kinematic mount for a liquid cell/cantilever chip holder.

The combined liquid cell/cantilever chip holder is preferably mounted kinematically to an SPM head as illustrated in FIG. 22. The kinematic mount consists of three balls 230, 231, 232 on the top surface 256 of the cell/holder assembly 236. These balls contact a cone 238, a slot 240, and a flat 242 on a lower surface 243 of the SPM head 258. A magnet 246 on the cell/holder assembly 236 secures the assembly against a ferromagnetic material 248 in the SPM head 256. Alternatively, magnets may be attached to the assembly and to the SPM head.

The magnetic force provided by the magnet 246 and ferromagnetic material 248 is sufficient to self-seat the assembly 236 in the kinematic mount and is stable enough during SPM imaging to provide nanometer-scale resolution. By using magnetic force to seat and retain the assembly, the entire assembly can be removed by hand, for example, to replace a cantilever. No special tools are required. Because of the quick-snap self-seating mechanism of the assembly, cantilever replacement is easy and quick, taking only a few seconds to perform. This feature is advantageous for use in a variety of applications including in semiconductor process control equipment and applications. This attachment mechanism can also be adapted for use in an automatic tip changer.

Both mounted and unmounted cantilevers can be used in the assembly. The kinematic mount of the cantilever holder gives 1 to 2 µm alignment repeatability when the same cantilever is replaced. When unmounted cantilevers are exchanged, the new cantilevers are aligned to within 10 to 100 µm after insertion.

Figure 23A:
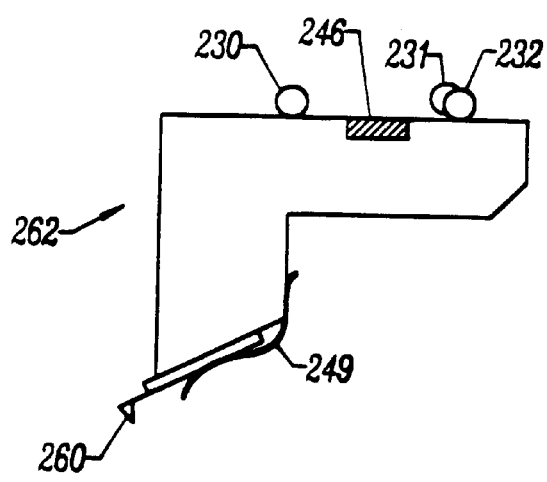
FIG. 23A illustrates a cantilever directly mounted on a cantilever holder.
Figure 23B:
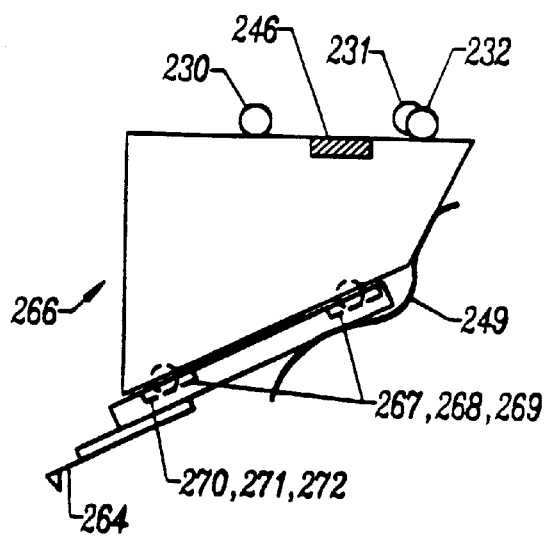
FIG. 23B illustrates a cantilever kinematically mounted on a cantilever holder.

FIG. 23A illustrates a cantilever 260 directly mounted to a holder 262. FIG. 23B illustrates a cantilever 264 kinematically mounted to a holder 266. As illustrated, the kinematic mount is formed of three balls 267, 268, 269 and complementary slots 270, 271, 272. Use of a kinematic mount for mounting the cantilever to the holder is preferred since it would increase alignment accuracy to within 10 to 20 µm. A spring clip 249 is illustrated for holding the cantilever in place.

The combined liquid cell/cantilever chip holder could also be used with special engineered cantilevers which allow microinjection of substances. For example, a cantilever holder could be adapted to accept pulled pipette cantilevers with a sharp enough tip so that SPM imaging is still possible. The invention could also be combined with existing hollow tip cantilevers to allow microinjection of substances.

While the present invention is disclosed by reference to the preferred embodiments and examples detailed above, it is to be understood that these examples are intended in an illustrative rather than limiting sense, as it is contemplated that modifications will readily occur to those skilled in the art, which modifications will be within the spirit of the invention and the scope of the appended claims.

What is claimed is:

1. An optical microscope stage comprising:

a sample stage having a horizontal surface on which a sample holder may be positioned;

a coarse x-y control stage for supporting a head of a scanning probe microscope (SPM) above the sample stage and moving the SPM head relative to the sample stage; and a member positioned adjacent the horizontal surface of the sample stage, the member comprising an internal perimeter that defines an interior space which allows a sample holder to be positioned on the horizontal surface of the sample stage within the internal perimeter, the member being laterally movable relative to the horizontal surface independent of the sample holder such that the member repositions the sample holder relative to the horizontal surface by laterally pushing the sample holder without lifting the sample holder, the interior space defined by the inner perimeter of the member being sufficiently large that the sample holder may be within the interior space without contacting the internal perimeter of the member.

2. An optical microscope stage according to claim 1, wherein the coarse x-y control stage includes a kinematic mount for a SPM head.

3. An optical microscope stage according to claim 2, wherein the kinematic mount includes a cone, a slot, and a flat.

4. An optical microscope stage according to claim 1, wherein the optical microscope stage further includes a locking jack for raising and lowering an SPM head relative to the course x-y control stage.

5. An optical microscope stage according to claim 1, further including a sample holder.

6. An optical microscope stage according to claim 5, wherein the sample holder is magnetically attached to the sample stage.

7. An optical microscope stage for use as a sample stage of a scanning probe microscope (SPM), the optical microscope stage comprising:

a horizontal surface on which a sample holder may be positioned;

a member positioned adjacent the horizontal surface of the sample stage, the member comprising an internal perimeter that defines an interior space which allows a sample holder to be positioned on the horizontal surface of the sample stage within the internal perimeter, the member being laterally movable relative to the horizontal surface independent of the sample holder such that the member repositions the sample holder relative to the horizontal surface by laterally pushing the sample holder without lifting the sample holder, the interior space defined by the inner perimeter of the member being sufficiently large that the sample holder may be within the interior space without contacting tie internal perimeter of the member.

8. An optical microscope stage according to claim 7, further including a sample holder.

9. An optical microscope stage according to claim 8, wherein the sample holder is magnetically attachable to the optical microscope stage.

* * * * *